US012213636B2

(12) United States Patent
Budampati et al.

(10) Patent No.: US 12,213,636 B2
(45) Date of Patent: Feb. 4, 2025

(54) RESIDENTIAL DEVICE FEEDBACK SYSTEM AND METHOD

(71) Applicant: PENTAIR PLC, London (GB)

(72) Inventors: Ramakrishna Budampati, Woodbury, MN (US); Joseph Krueger, Edina, MN (US); Jason Fitzpatrick, Glen Ellyn, IL (US)

(73) Assignee: PENTAIR PLC, London (GB)

( * ) Notice: Subject to any disclaimer, the term of this patent is extended or adjusted under 35 U.S.C. 154(b) by 338 days.

(21) Appl. No.: 17/347,280

(22) Filed: Jun. 14, 2021

(65) Prior Publication Data

US 2021/0298557 A1    Sep. 30, 2021

Related U.S. Application Data

(63) Continuation of application No. PCT/GB2019/053532, filed on Dec. 12, 2019.
(Continued)

(51) Int. Cl.
*A47L 15/00* (2006.01)
*A47L 15/42* (2006.01)
(Continued)

(52) U.S. Cl.
CPC ....... *A47L 15/0063* (2013.01); *A47L 15/0049* (2013.01); *A47L 15/4244* (2013.01);
(Continued)

(58) Field of Classification Search
CPC ............ A47L 15/0063; A47L 15/0049; A47L 15/4244; A47L 2401/09; A47L 2401/19;
(Continued)

(56) References Cited

U.S. PATENT DOCUMENTS

| 9,954,692 | B2 * | 4/2018 | Brandt | .............. | H04W 24/02 |
| 2005/0125083 | A1 * | 6/2005 | Kiko | ................ | H04L 12/282 |
| | | | | | 700/20 |

(Continued)

FOREIGN PATENT DOCUMENTS

EP    2706138 A1    3/2014

OTHER PUBLICATIONS

International Search Report and Written Opinion, International Application No. PCT/GB2019/053530, dated Jun. 23, 2020, 15 pages.

*Primary Examiner* — Mohammad Ali
*Assistant Examiner* — Sheela Rao
(74) *Attorney, Agent, or Firm* — Husch Blackwell LLP

(57) ABSTRACT

Systems and methods are described, which relate to internet-of-things (IoT) feedback systems, in which data received from a given IoT device may be analyzed by a controller and used as a basis for controlling another IoT device and/or sending an alert to a user. The controller may activate a dehumidifier upon detecting activation of a sump pump. The controller may monitor water level data and alert a user and/or request maintenance of the sump pump upon detecting the water level exceeds a threshold. The controller may monitor dishwasher data to detect suboptimal performance of a dishwasher, in response to which the controller may instruct valves of a manifold and water heater to close to isolate the dishwasher, and instruct a water softener to elevate salt levels of softened water during a self-cleaning cycle of the dishwasher.

10 Claims, 11 Drawing Sheets

Related U.S. Application Data

(60) Provisional application No. 62/778,492, filed on Dec. 12, 2018.

(51) Int. Cl.
*H04L 12/28* (2006.01)
*H04L 67/125* (2022.01)

(52) U.S. Cl.
CPC ...... *H04L 12/2816* (2013.01); *H04L 12/2823* (2013.01); *H04L 67/125* (2013.01); *A47L 2401/09* (2013.01); *A47L 2401/19* (2013.01); *A47L 2501/26* (2013.01); *H04L 2012/285* (2013.01)

(58) Field of Classification Search
CPC ............. A47L 2501/26; H04L 12/2816; H04L 12/2823; H04L 67/125; H04L 2012/285; H04L 12/2807; G01M 3/04; G01M 3/26
See application file for complete search history.

(56) References Cited

U.S. PATENT DOCUMENTS

| | | | |
|---|---|---|---|
| 2007/0053513 A1* | 3/2007 | Hoffberg | G06V 40/103 380/201 |
| 2013/0337822 A1 | 12/2013 | Rubin et al. | |
| 2016/0373944 A1 | 12/2016 | Jain et al. | |
| 2018/0097652 A1 | 4/2018 | Wouhaybi et al. | |
| 2019/0346414 A1* | 11/2019 | Ting | G01N 33/18 |

* cited by examiner

RESIDENTIAL DEVICE FEEDBACK SYSTEM AND METHOD

CROSS-REFERENCE TO RELATED APPLICATIONS

This application is a continuation of International Application No. PCT/GB2019/053532, filed Dec. 12, 2019, which claims priority to U.S. Provisional Application No. 62/778,492 filed Dec. 12, 2018, which are incorporated by reference in their entirety for all purposes.

BACKGROUND

Water supplied to a home or business, whether through a well or a municipal water supply, may be used in a variety of applications such as drinking, cooking, showers, baths, toilets, pools, agricultural maintenance, and even heat. With conventional water systems and related devices, one may be able to determine the total amount of water used in their home or business by checking, in person, a meter at the main water feed. However, such conventional meters do not provide information as to how much water is used at each of the various taps and appliances within a home or business, do not provide information about water leaks that may have occurred, and the information that is provided is generally not accessible remotely. Thus, a home or business owner remains uninformed of any potential leaks, misuse, or overuse of water in their home or business, which may be financially and environmentally harmful. This is especially true for homes and business with water filtration systems and water softeners, where the waste of filtered or softened water is even more costly than the waste of otherwise untreated water.

Many homes and businesses may be equipped with water-related devices such as dehumidifiers, sump pumps, dishwashers, and washing machines, as well as chemical controllers, pumps, heaters, and skimmers for pools. Conventionally, such water-related devices include or are connected to one or more controllers through which a user may manually or automatically operate these devices. However, when away from their home or business, a person is generally unable to monitor or control these devices. For example, a homeowner may be unable to remotely instruct a conventional chemical controller for their pool to operate less frequently in their absence, to remotely instruct a conventional sump pump in their basement to turn on in anticipation of inclement weather to prevent flooding, to be informed if an animal or object enters their pool, or to be informed if a water leak has occurred in their home. As another example, when a sump pump system experiences a fault, such as loss of power, a conventional pump control system may not be capable of alerting the home or business owner remotely. A delay in the home or business owner being notified about a fault in the sump pump system can undesirably result in flooding of the home or business.

SUMMARY

In light of the deficiencies described above, new systems and methods for providing individuals with the ability to monitor and control the status of water systems and related devices inside and outside of a home or business and to optimize the performance of these systems and devices and overall water use within the home or business are desirable.

In an example embodiment, a method may include steps of analyzing, by a control system, parameters of a data trigger to determine data to be collected from a first network-enabled device, collecting, by the control system, data from a data stream output by the first network-enabled device, determining, by the control system, that the data trigger is met by the data, determining, by the control system, commands associated with the data trigger, sending, by the control system, the commands to a second network-enabled device to be executed, generating, by the control system, a report, and sending, by the control system, the report to a user device.

In some embodiments, the first network-enabled device may include a sump pump. The second network-enabled device may include a dehumidifier. The data trigger may include an indication that the sump pump has activated. The commands may cause the dehumidifier to activate. The report may include an alert indicating flooding or leaking in an area associated with the sump pump.

In some embodiments, the method may include steps of receiving, by the control system, water level data from a water level sensor, determining, by the control system, that the water level data exceeds a predetermined threshold, and sending, by the control system, a maintenance alert to the user device indicating that the sump pump has malfunctioned.

In some embodiments, the method may include steps of determining, by the control system, that automatic maintenance requests are enabled, and sending, by the control system, a request for maintenance to a service provider.

In some embodiments, the first network-enabled device may include a dishwasher. The second network-enabled device may include a manifold having a plurality of controllable valves. The data trigger may include detection of suboptimal performance of the dishwasher. The commands may cause the manifold to close a subset of the plurality of controllable valves. The report may include an alert indicating that the subset of the plurality of controllable valves have been closed.

In some embodiments, the method may include a step of controlling, by the control system, a water softener subsystem to cause softened water with an elevated salt level to be supplied by a water softener to the dishwasher while the subset of the plurality of controllable valves are closed.

In some embodiments, the method may include a step of controlling, by the control system, the dishwasher to perform a self-cleaning cycle while the subset of the plurality of controllable valves are closed and while the softened water with the elevated salt level is supplied by the water softener.

In some embodiments, the method may include steps of controlling, by the control system upon completion of the self-cleaning cycle, the water softener subsystem to cause the softened water to be supplied by the water softener with a non-elevated salt level, and controlling, by the control system upon completion of the self-cleaning cycle, the manifold to reopen the subset of the plurality of controllable valves.

In an example embodiment, a system may include a water system and a communication system. The water system may include a water softener, a manifold, and a dishwasher. The water softener may be coupled to a water source and configured to apply an amount of salt to unsoftened water to produce softened water, the water softener having a water softener output. The manifold may include a plurality of manifold outputs, a manifold input that is coupled to the water softener output. The plurality of manifold outputs may be selectively controllable to open or close. The dishwasher may have a first dishwasher input coupled to a first manifold output of the plurality of manifold outputs. The communication system may include a gateway device and a controller. The gateway device may be coupled to and in electronic communication with the manifold, the dishwasher, and the water softener. The controller may be to the gateway device. The controller may include a processor and a memory device comprising computer-readable instructions which, when executed, cause the processor to communicate with and control the manifold, the dishwasher, the water heater and the water softener during a self-cleaning cycle of the dishwasher.

In some embodiments, the system may include an appliance having a first appliance input and a second appliance input, the first appliance input being coupled to a second manifold output of the plurality of manifold outputs and a water heater having a water heater input coupled to a third manifold output of the plurality of manifold outputs, a first water heater output coupled to a second dishwasher input of the dishwasher, and a second water heater output coupled to the second appliance input, wherein the first water heater output and the second water heater output are selectively controllable to open or close.

In some embodiments, the instructions, when executed, may cause the processor to receive a data stream from the dishwasher, detect suboptimal performance of the dishwasher based on the data stream, and upon detecting the suboptimal performance of the dishwasher, cause the dishwasher to initiate the self-cleaning cycle.

In some embodiments, the instructions, when executed, may cause the processor to, prior to initiation of the self-cleaning cycle of the dishwasher, cause the manifold to open the first manifold output and the third manifold output, and to close a subset of the plurality of manifold outputs, the subset including the second manifold output, and, prior to initiation of the self-cleaning cycle of the dishwasher, close the second water heater output and open the first water heater output.

In some embodiments, the instructions, when executed, may cause the processor to control the dishwasher to perform the self-cleaning cycle, and, during the self-cleaning cycle of the dishwasher, cause the water softener to increase the amount of salt applied to produce the softened water from an original amount to an elevated amount.

In some embodiments, the instructions, when executed, may cause the processor to determine that the self-cleaning cycle is complete, cause the water softener to reduce the amount of salt applied from the elevated amount to the original amount, cause the manifold to open the subset of the plurality of manifold outputs, and cause the water heater to open the second water heater output.

In an example embodiment, a system may include a sump pump configured to pump water from an area around the sump pump to a drain, a dehumidifier, a water level sensor configured to generate water level data representing a water level in the area, and a communications system. The communication system may include a gateway device and a controller. The gateway device may be coupled to and in electronic communication with the sump pump, the dehumidifier, and the water level sensor. The controller may be coupled to the gateway device. The controller may include a processor and a memory device configured to store instructions which, when executed, cause the processor to receive data from the sump pump, determine, based on the data, that the sump pump has activated, and cause the dehumidifier to begin operation.

In some embodiments, the instructions, when executed, may cause the processor to send an alert to a user device associated with the system, the alert indicating that flooding has been detected in the area.

In some embodiments, the instructions, when executed, may cause the processor to receive the water level data from the water level sensor, determine, based on the water level data, that the water level in the area exceeds a predetermined threshold, and send a maintenance alert to the user device, indicating that the sump pump has malfunctioned.

In some embodiments, the instructions, when executed, may cause the processor to determine that automatic maintenance requests are enabled, and, upon determining that the water level in the area exceeds the predetermined threshold, sending a request for maintenance of the sump pump to a service provider.

In some embodiments, the system may include a humidity sensor configured to detect a humidity level of the area and generate corresponding humidity data, and a moisture sensor configured to generate a moisture alert upon detecting moisture in the area.

In some embodiments, the instructions, when executed, may cause the processor to receive the humidity data from the humidity sensor, determine, based on the humidity data, that the humidity level of the area exceeds a predetermined humidity threshold, receive the moisture alert from the moisture sensor, and, upon receiving the moisture alert and determining that the humidity level exceeds the predetermined threshold, activating the sump pump.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with a system may have corresponding features definable and/or combinable with respect to a method or vice versa, and these embodiments are specifically envisaged.

DESCRIPTION OF THE DRAWINGS

The invention will be better understood and features, aspects and advantages other than those set forth above will become apparent when consideration is given to the following detailed description. Such detailed description makes reference to the following drawings.

DETAILED DESCRIPTION

Figure 1:
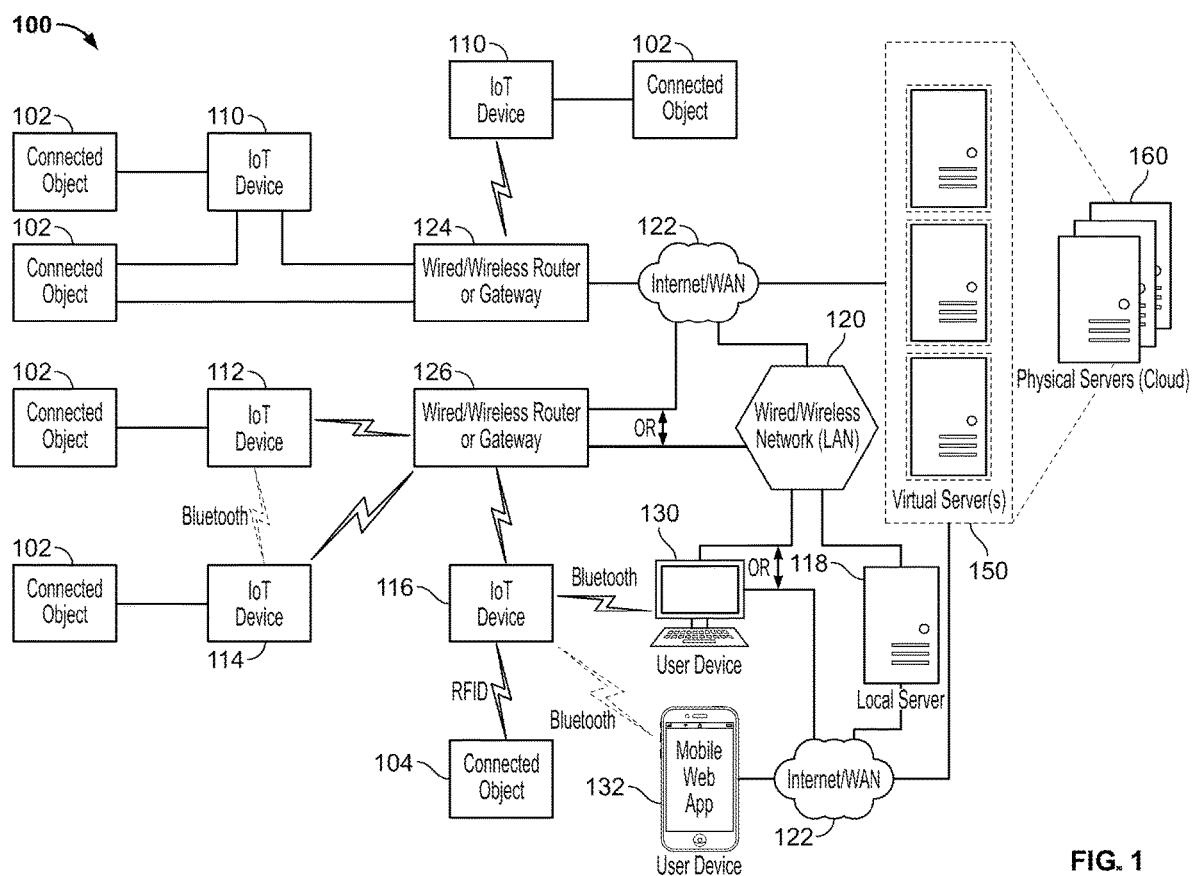
FIG. 1 is a diagram of a computing environment for deploying Internet of Things (IoT) devices in accordance with various embodiments of the invention.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

The invention is a communication system using computer-implemented methods to provide an infrastructure of a computing environment in which connected devices can communicate electronically to exchange, aggregate, analyze, and react to data describing water usage and device operations within one or more residential water systems. The connected devices may be, or may interface with, water system components such as valves, switches, manifolds, pumps, sensors, and integrated components such as water softener systems, filtration systems, and water-using appliances. The infrastructure can facilitate communications between connected devices that communicate using different protocols/formats (e.g., devices from different manufacturers); further, the infrastructure can facilitate aggregation and normalization of communications and other data generated by such devices, enabling a more holistic data-based view of water system operations, conditions, and history. The communication system can analyze aggregated information to identify problems in the water system and issue commands to connected devices in order to resolve and/or remediate the problems; for example, the system can identify a problem in a first water subsystem (e.g., a water softener system) and, using the provided algorithms, cause components of a second water subsystem (e.g., a water point-of-entry (POE) system or a filtration system) to perform functions that address the identified problem. The system can include various application programming interfaces (APIs) for connecting devices to the infrastructure, specifying parameters for data collection and analysis, receiving and responding to reports and/or alerts, and performing other administrative functions associated with the residential water system(s).

FIG. 1 illustrates an example computing environment 100 for wired and/or wireless monitoring and control of electronic and mechanical devices that are deployed in a physical environment, such as a home or residential environment, a commercial building, a farm or other agricultural facility, industrial environments such as factories and refineries, and any other physical environment where it is feasible and beneficial to deploy so-called "smart" devices, which are natively or retroactively enabled to connect to the internet or another wide-area network (WAN) 122 to send and receive electronic data. In particular, such devices become "connected objects" 102, 104 in the computing environment 100 by interfacing with an internet enabled device, referred to herein as an "Internet-of-Things" (IoT) device, in accordance with various embodiments described herein. Other significant entities, such as a person, an animal (e.g., a farm animal), a pipe or pipeline, a body of water, or the physical environment itself, may become a connected object 102, 104 in the computing environment 100 by interfacing with an IoT device. The interface or connection between a connected object 102, 104 and an IoT device 110, 112, 114, 116 may depend on several factors, non-limiting examples of which include: whether the object is electronic, mechanical, organic, etc.; whether the object is "natively" connected, having the IoT device or another transmitter built-in, or the IoT device is added or connected to the object to make the object "connected;" whether the IoT device connects directly to the connected object, and/or connects to other objects or must be disposed in a particular location (e.g., to deploy a sensor); and, whether the IoT device sends data to the connected object, receives data from the connected object, or both. Example interfaces/connections are described below with respect to FIGS. 1 and 2.

Each of the IoT devices 110-116 may be embedded with electronics, software, sensors, actuators, and network connectivity, either within the device itself or in cooperation with connected servers 118, 160, which enable the IoT devices 110-116 and their embedded software to collect and exchange data. In some embodiments, various IoT devices 110-116 in an environment 100 may send and/or receive data transmissions over a WAN 122, a local area network (LAN) 120, and/or another communication network using any suitable communication protocol. For example, the IoT devices 112-116 may communicate over the LAN 120 with a local server computing device 118, such as in a private network where transmitted data to/from the IoT devices is isolated from the internet or another WAN 122, at least until the data is processed by the local server 118. In some embodiments, (a) local server(s) 118 may be operated at the same location as the IoT devices 112-116, such as at a residence or in an office building. A user device 130 may also be connected to the LAN 120 in order to access the IoT data as described below; alternatively, IP connectivity may be used, connecting the LAN 120 and/or the local server(s) 118 to the Internet or another WAN 122, so that the local and/or remote user devices 130, 132 can access the local server 118.

In still other embodiments, one or more of the IoT devices 110-116 may connect, directly or through a router, gateway, base station, etc. (shown as wired/wireless router or gateway 124, 126), to the WAN 122 in order to communicate with cloud-based computing resources. Such an environment provides a bi-directional, direct-to-cloud communication between the IoT devices 110-116 and one or more application and/or hosting servers. In some embodiments, IoT devices 110-116 may communicate with and directly use the resources of one or more physical, remote server computing devices 160, which may be deployed in one or more data centers (for example) in a particular geographic location or dispersed throughout several geographic locations. In other embodiments, the remote physical servers 160 may cooperate to provide virtualized computing resources that can be allocated for use by, for example, an authorized user of a computing resource service provider. Thus, a user that controls, or provides services for, the IoT devices 110-116 may configure and deploy one or more virtual servers 150 that are allocated the use of certain physical computing resources, such as processor cycles, memory, data storage, etc., of the physical servers 160; the IoT devices 110-116 may, in turn, be configured to connect to the virtual servers 150. For example, an IoT device 110 may be programmed to connect to an IP address associated with an endpoint that connects a virtual network adapter of the servers 150 to a physical network adapter of the physical servers 160. The virtual servers 150, or the computing resource service provider's computing environment in which the virtual servers 150 are deployed, may provide other computing resource services for implementing an IoT platform as described further below.

Given this bi-directional, cloud-based environment, each IoT device 110-116 may be deployed as a direct-to-cloud IoT device. In other words, the deployment of multiple IoT devices 110-116 in a LAN-based or cloud-based environment provides for an internetworking of physical devices, connected devices, and/or smart devices at the network level. Various communication protocols between components may be used, depending on the types of devices connecting to each other and the type, amount, and frequency of data being exchanged. Non-limiting examples of connection protocols include: an IoT device 110, such as a base station or fixture, may have a wired (e.g., CAT5, USB) connection to a router 124 and may use any TCP/IP protocol for wired connections; or, an IoT device 110 may have a wireless connection to a router 124, and may use wireless TCP/IP protocols such as WiFi or MQTT; an IoT device 112 may communicate directly with another IoT device 114 using the above wireless protocols or other suitable protocols such as Bluetooth; IoT device 110-114 connections to a connected object 102 may be wired, or may be indirect based on a sensor interface; or, an IoT device 116 may connect wirelessly to the connected object 104, using a suitable protocol such as RFID for an RFID-enabled connected object 104. More generally, a communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, a 5G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the pressure switch 201 the router/modem 124, 126, the cloud based server 150, and/or the internet enabled device 110 can each be any suitable communications link or combination of communications links, such as wired links, fiber optic links, Wi-Fi links, Bluetooth links, cellular links, etc.

A user may operate one or more client computing devices 130, such as a desktop or laptop computer, or a mobile computing device 132 such as a phone or tablet, running client software that enables the device 130, 132 to access an interface to the IoT platform provided by a server 118, 150, 160. Each of these client computing devices 130, 132 may include at least one processor executing specific computer-executable instructions (i.e., the running software) stored in a memory coupled to the client computing device. The user may access and run a client-based software such as a web browser or web application, in order to request access to the system level software and/or the GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 130, 132 for display. The server(s) 118, 150, 160 may include components and data processing capabilities used to host and run software applications that allow for bi-directional communication between each IoT device 110-116 and the server(s). For example, the server(s) may host the customizable software that is deployed to, and installed on, each IoT device 110-116. The server(s) may also run the software and protocols for other services used by the IoT platform, as well as for the interface to the client computing devices 130, 132. Example uses of the user interface to the IoT platform include configuring and deploying server resources, configuring and deploying software and settings for IoT devices, obtaining and/or reviewing data collected by the server(s) from the IoT devices 110-116 (e.g., viewing current status), performing and/or reviewing data analysis, accessing particular IoT devices 110-116, etc.

Figure 2:
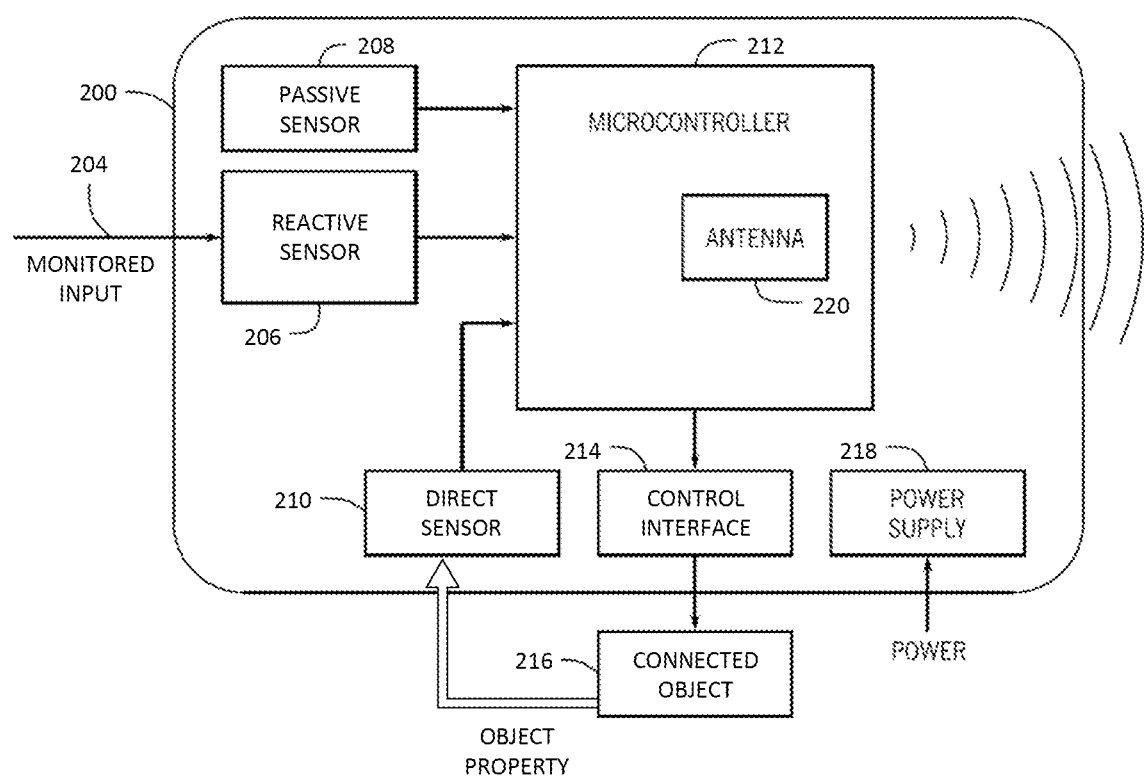
FIG. 2 is a block diagram of an example embodiment of an IoT device.

FIG. 2 shows the internal (i.e., partially or fully inside a housing) components of an example IoT device 200 in accordance with some embodiments of the invention (e.g., as an example of one or more of the IoT devices 110-116 of FIG. 1). As shown in FIG. 2, an IoT device 200 may serve to both collect data associated with a connected object 216, and control one or more operations and/or operating parameters of the connected object 216; in other embodiments, an IoT device for the connected object 216 may only collect and report data, or only control operations/configurations of the connected object 216. To collect data associated with the connected object 216, the IoT device 200 may include, connect to, or communicate with one or more of several different types of sensors. Non-limiting examples of types of sensors that may cooperate with or be incorporated in the IoT device 200 include reactive sensors 206, passive sensors 208, and direct sensors 210, among others. A reactive sensor 206 can detect and report certain monitored inputs 204 on the connected object 216 or the IoT device 200 itself; examples include a pressure transducer that detects a button press or a fluid pressure level, a moisture sensor, a flow rate sensor, a photodiode or other light receptor, and a sample analyzer that collects a sample (e.g., of water in which the sensor 206 is submerged) and measures a property of the sample (e.g., total dissolved solids; note that a sample analyzer may also be a direct sensor 210 if the connected object 216 is a body of water (as opposed to a water filter in the body of water)). A passive sensor 208 can detect environmental and other ambient properties; examples include an ambient temperature sensor, an ambient light sensor (e.g., for sunlight), a humidistat, etc. A direct sensor 210 can be connected to the connected object 216, or in communication therewith, or otherwise oriented to monitor one or more specific properties of the connected object 216; examples include a thermistor for monitoring the temperature of the connected object 216, a biometric sensor, a sample analyzer (e.g., of water at the inlet or outlet of a water filter), a current sensor, a speed sensor, etc.

Any of the sensors 206-210 may be configured to monitor a corresponding property continuously, at intervals, or randomly, and/or may "listen" for inputs and react when they are detected. Sensors 206-210 may also continuously generate data, or may only generate data at intervals, or only when the monitored property meets one or more particular thresholds; the generated data may describe the state of the property being measured. The sensors 206-210 may send the data to a microcontroller 212 of the IoT device 200. A microcontroller 212 may be any suitable microprocessor, including single- and multi-core CPUs, wireless-enabled microcontrollers, and other known microcontrollers having the processing power to receive data from the sensors and transmit the data to a receiving device such as a gateway/router or a local or cloud server. In some embodiments, the microcontroller 212 can be configured to itself act as a wireless gateway module. For example, the microcontroller 212 can be implemented using a single-chip wireless microcontroller, such as the CC3200MOD microcontroller available from Texas Instruments® (of Dallas, Tex.), which can include a CC3200R1M2RGC microcontroller from Texas Instruments®. A microcontroller 212 may further have sufficient computing power to receive control commands from a router/gateway, a server, another IoT device, or a client computing device, and deliver the control commands to the connected object 216 as described below. The microcontroller 212 may further have sufficient resources to store and execute data analysis algorithms, such as processing methods that enable the microcontroller 212 to evaluate sensor 206-210 data and issue control commands to the connected object 216 based on the evaluated data. For example, the microcontroller 212 and/or the IoT device 200 can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., microcontroller 212) in the form of computer executable instructions that, when executed by the hardware processor, cause the hardware processor to perform one or more actions as indicated by the instructions.

In some embodiments, the microcontroller 212 or the IoT device 200 can include one or more antennas 220 configured to send and/or receive wireless signals, such as signals for communicating over Wi-Fi, Bluetooth, ZigBee, Z-Wave, free-space optical, etc. In some such embodiments, the antenna(s) 220 can receive signals from the wireless gateway module, and can transmit the signals to the microcontroller 212 for processing into commands. Additionally or alternatively, the antenna 220 can send signals generated by the microcontroller 212 to the wireless gateway/router. In some embodiments, the antenna(s) 220 can be an integral part of the microcontroller 212. Alternatively, in some embodiments, the antenna 220 can be mounted to a printed circuit board (PCB) and electrically connected to the microcontroller 212, and/or can be mounted to a housing of the IoT device 200. In some embodiments, the IoT device 200 can communicate with server(s) and/or other IoT devices in the network using the antenna(s) 220. For example, the IoT device 200 can use the antenna(s) 220 to communicate using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.).

In some embodiments, the IoT device 200 can include a control interface 214 that enables the IoT device 200 to control operations and/or to change configuration settings or other data of the connected object 216. The control interface 214 may include any suitable electrical and/or electronic components and connections needed to enable the desired control of the connected object 216. For example, a control interface 214 for a water pump can connect to the power supply circuit of the pump and, based on signals from the microcontroller 212, selectively provide power for operation of the pump. In this example, the control interface 214 or the IoT device 200 can be connected to both a source of power (e.g., a household electrical grid) and wires/cable(s) connected to the pump, and can either provide power to the pump or inhibit power from being provided to the pump. The microcontroller 212 may provide the appropriate format of signal to cause the control interface 214 to apply the desired control. For example, in an analog environment such as the pump power control, the control interface 214 may be a series of switches, and the microcontroller 212 may send one or more signals that open or close the switches as needed to apply the desired power setting. In another example, the connected object 216 may be a digital device, and the control interface 214 may be an application programming interface (API) that converts the microcontroller 212 control signals to function calls that the control interface 214 sends to the connected object 216 to change its operating parameters.

In some embodiments, the IoT device 200 can include a power supply 218 that can provide power for operation of the microcontroller 212 and/or any other suitable low voltage devices within the IoT device 200. For example, the IoT device 200 can receive input power at 230 V and 60 Hertz (Hz), which is not suitable for operation of the microcontroller 212, which is typically a low voltage device (e.g., operating at 3.3 V DC, 5 V DC, 12 V DC, 24 V DC, etc.). In some embodiments, power supply 218 can receive AC power (e.g., at 230 V, 60 Hz), convert the AC power to low voltage DC power, and distribute power to one or more other components of the IoT device 200, such as the microcontroller 212. In other embodiments, the power supply 218 may be one or more onboard batteries (e.g., AAA batteries) contained within the housing of the IoT device 200. The power supply 218 may provide power in a variety of other ways, for example, from harvested energy, wirelessly through inductive coupling or resonant inductive coupling, or in any other known way. In some embodiments, the power supply 218 or another energy storage device such as a battery, an ultracapacitor, a fuel cell, etc., can provide supplemental power to continue to operate the IoT device 200 when an external power supply is interrupted, or a primary battery fails.

Figure 3:
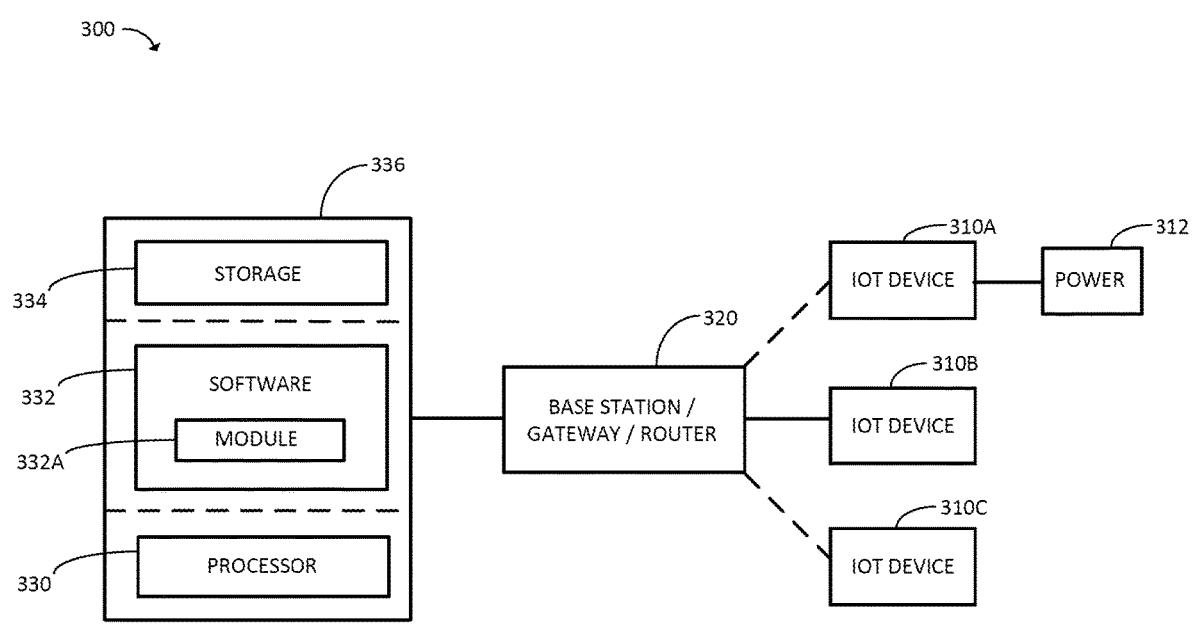
FIG. 3 is a block diagram of an example embodiment of a system in accordance with embodiments of the invention, including a server and IoT devices.

FIG. 3 is a block diagram 300 that illustrates additional details of a communication system. The block diagram 300 includes IoT devices 310A-C, a power source 312, a base station, router, or gateway 320, a server 336, a processor 330, software 332, and storage 334.

As described above, the IoT devices 310 may sense data about the environment and/or users and/or a connected object; an IoT device 310A-C can provide raw sensor data and/or processed sensor data to server 336 via gateway 320. Additionally, or alternatively, the IoT devices 310 may receive data, such as control signals generated by the server 336 or a client computing device or sensor data from other IoT devices, from the server 336 via the gateway 320. The IoT devices 310 may communicate with the gateway 320 through a wired (e.g., IoT device 310B) or wireless connection. The IoT device 310B may also receive power through its wired connection with the gateway 320; the IoT device 310A receives power from the power source 312; the IoT device 310C does not have a separate power source and may instead rely on piezoelectric technology or other technology to provide sufficient energy for transmitting information to the gateway 320. Depending on the embodiment, the IoT devices 310 may employ a range of technologies. For example, the IoT devices 310 may detect heat or pressure changes, may detect touch, or may detect changes in a variety of health indicators. Certain IoT devices 310 may rely on Bluetooth, iBeacon, or near field communication technology. In some embodiments, the IoT devices 310 may include an accelerometer. The IoT devices 310 may be present in a variety of locations within an organization's environment. The IoT devices 310 may be embedded in an article of furniture, such as a chair or table, and/or may be embedded in or coupled to a wall, partition, ceiling, of floor. The IoT devices 310 may also be associated with a user, present, for example, in a user's identification badge or mobile communication device (e.g., a smartphone, in a wrist worn device, etc.).

The gateway 320 relays information to the server 336 and may be coupled to the server 336 via a LAN or wide area network (WAN). The gateway 320 may be any device suitable to receive, aggregate, and/or relay information from the IoT devices 310A-C, including, for example, a wireless router or a Room Wizard™. The gateway 320 may include existing technology affiliated with other services of an organization or may be provided to an organization specifically for use with the IoT devices 310. For example, the gateway 320 may be provided in the form of a base station comprising computing resources, such as a processor, memory, and specific program instructions (e.g., software or firmware) that the processor executes to communicate with and/or monitor deployed IoT devices 310. In some embodiments, more than one gateway 320 may be used to optimize performance. For example, the number and/or positioning of gateways may depend on the number and/or positioning of IoT devices 310.

As information from one or more IoT devices 310 reaches the server 336, software 332 may determine how the information is processed. In this embodiment, a software module 332A can configure a commands processor 330 to perform a variety of tasks, such as processing collected data from the IoT devices 310 and/or sending control signals to the IoT devices 310 for controlling the corresponding connected object(s). For example, processor 330 may analyze incoming data related to a user's location, orientation, or interaction with a client computing device. The processor 330 may make determinations or conclusions about a user or group of users, or an object or group of objects, or other environmental or input conditions, based on incoming data. The processor 330 may also relay information or send conclusions to a user or group of users. Incoming data from IoT devices 310, other incoming data or inputs, conclusions, and other data may be stored in storage 334.

In various embodiments, the server 336 may be a virtual server or may represent a cluster of servers. Some or all portions of the block diagram may be located physically on site at an organization's location and some or all may be stored remotely in the cloud. For example, in one embodiment, server 336 may physically include the processor 330 while the software 332, the software module 332A, and the storage 334 are located in a remote or cloud server. In another embodiment, only the software 332 or the storage 334 may be located in a remote or cloud server. The software module 332A may additionally communicate with a variety of other servers, processors, hardware, and software located in the server 336 or in other servers or other locations. For example, the software module 332A may communicate with a second server to ensure that a user's calendar or reservation information is up-to-date.

Figure 4:
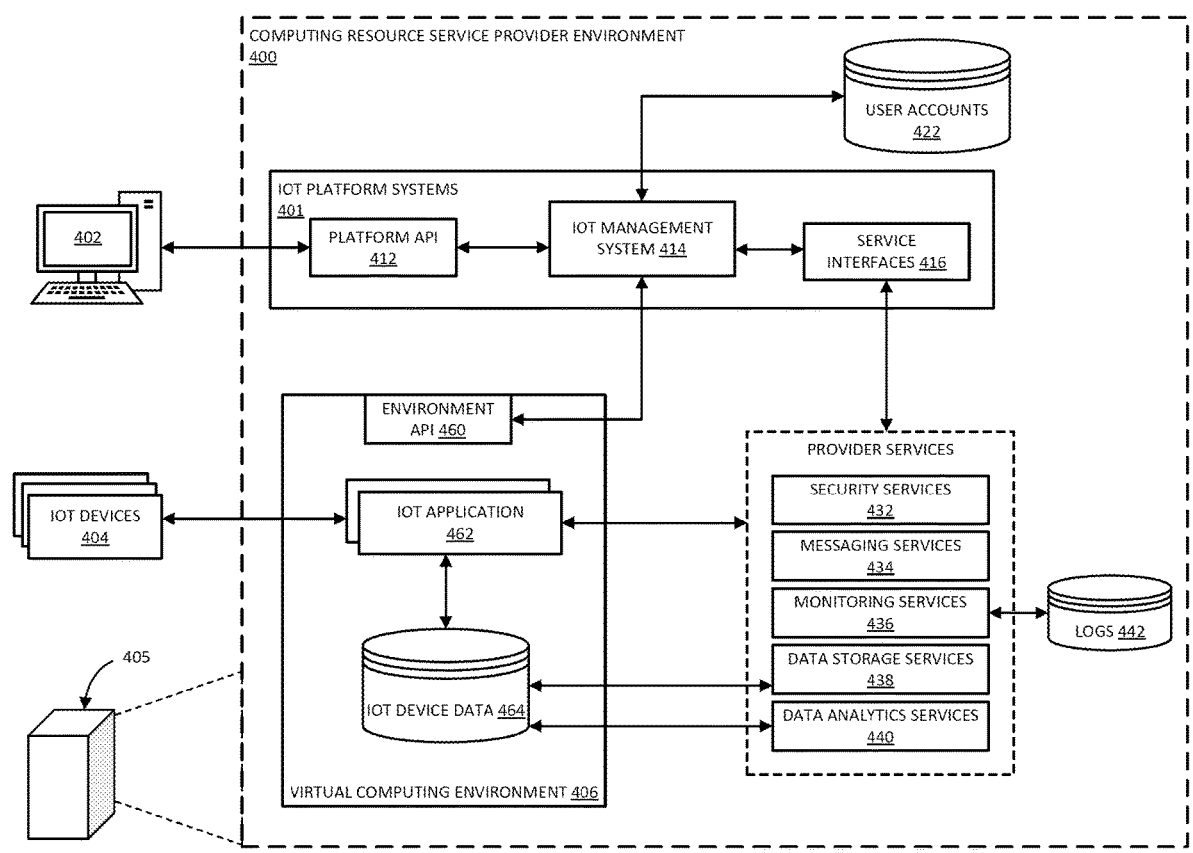
FIG. 4 is a block diagram of an example embodiment of another computing environment in accordance with some embodiments of the invention.

Referring to FIG. 4, embodiments of the invention may operate within or upon computing systems (e.g., the hardware computing device 405) of a computing resource service provider that provide a computing environment 400 accessible, via one or more computer networks, by users of user computing devices 402 and by one or more IoT devices 404 configured and deployed as described above. The computing environment 400 may, for example, be provided by the virtual servers 150 and/or the physical servers 160 of FIG. 1 (i.e., computing device 405 may be one of the physical servers 160 of FIG. 1). That is, where FIG. 1 illustrates the conceptual operation of the present systems and methods in interaction, via computing devices 130, 132, with a "client," or administrator of the IoT devices 110-116 deployed in a computing environment 100, FIG. 4 illustrates a computing architecture in which a client may access the computing systems of the computing resource service provider environment 400 (e.g., using the client's user account credentials) using a computing device 402 to connect to one or more user interfaces provided (e.g., as websites, web applications, command consoles, APIs, etc.) in the environment 400. The user interfaces may enable the client to manage virtual computing resources allocated to the client's account and configured to implement an IoT platform for the client's IoT devices 404.

The computing resource service provider environment 400 may include one or more systems 401 that cooperate to enable deployment of the IoT platform using a customized configuration for a particular user. The systems 401 may include a platform API 412 to which the client, via computing device 402, connects in order to configure, deploy, manage, and otherwise interact with the client's IoT platform. In some embodiments, the platform API 412 provides secure access to an IoT management system 414 that includes or accesses services and data needed to interact with an IoT platform, an IoT application 462, and/or IoT devices 404 that are deployed within or connect to the client's virtual computing environment 406, described below. In some embodiments, the IoT management system 414 may access one or more user account data stores 422 that contain user account information and other private information associated with the client's user account. For example, the IoT management system 414 may store and retrieve configuration settings for particular IoT devices 404 and/or IoT applications 462 that the client has previously submitted.

The computing resource service provider implements, within its computing environment 400, at least one virtual computing environment 406 in which users may obtain virtual computing resources that enable the users to run programs, store, retrieve, and process data, access services of the computing resource service provider environment 400, etc. The virtual computing environment 406 may be one of any suitable type and/or configuration of a compute resource virtualization platform implemented on one or more physical computing devices. Non-limiting examples of virtual computing environments 406 include data centers, clusters of data centers organized into zones or regions, a public or private cloud environment, etc. The virtual computing environment 406 may be associated with and controlled and managed by the client. In some embodiments, the virtual computing environment 406 of a particular client may be dedicated to the client, and access thereto by any other user or service of the computing resource service provider environment 400 prohibited except in accordance with access permissions granted by the client. In some embodiments, an environment API 460 may serve as a front-end interface that provides access to the resources of the virtual computing environment 406 based on whether or not requests to access the environment 406 are authorized. For example, the IoT management system 414 may deploy IoT platform-related resources, push configuration changes, and request information about such resources via calls to the environment API 460. Additionally or alternatively, other channels, such as TLS-encrypted data channels, may be enabled to allow data to enter or exit the environment 406 without passing through the environment API 460. For example, an IoT application 462 in the environment 406 may be configured to communicate directly with IoT devices 404 and/or certain services in the computing resource service provider environment 400.

In some embodiments, a client's IoT platform may be deployed by installing one or more IoT applications 462 into the client's virtual computing environment 406. An IoT application 462 may be a software program or suite of software programs including program instructions that enable a processor executing the IoT application 462 to communicate with deployed IoT devices 404, sending and/or receiving data, processing data, and making decisions in accordance with the desired goals and functions of the IoT platform. For example, the IoT application 462 may cause the processor to receive sensor data from the IoT devices 404, process the data to determine whether to take any actions, and then perform any identified action such as reporting the status of connected objects to the client, sending new commands to one or more of the IoT devices 404, storing data (e.g., in an IoT device data store 464), etc. The IoT application may be executed within virtual computing resources allocated to the client's virtual computing environment 406, such as one or more virtual machine instances or logical container instances configured to provide virtualized physical computing resources for the purpose of performing the IoT application's functions. For example, a virtual machine instance may be launched from a software image including the configuration information (e.g., operating system, memory, disk storage, network interface configuration, and software program code) needed to provide an execution environment for the IoT application 462.

The computing resource service provider environment 400 may include data processing architecture that implements systems and services that operate "outside" of any particular user's virtual computing environment and perform various functions, such as managing communications to the virtual computing environments, providing electronic data storage, and performing security assessments and other data analysis functions. These systems and services may communicate with each other, with devices and services outside of the computing resource service provider environment 400, and/or with the virtual computing environments. Services depicted in the figures as inside a particular virtual computing environment 406 or outside all virtual computing environments may be suitably modified to operate in the data processing architecture in a different fashion than what is depicted. The IoT management system 414 may include or communicate with one or more service interfaces 416, such as APIs, that enable the IoT management system 414 and/or other components of a deployed IoT platform (e.g., an IoT application 462) to interact with one or more of these systems and services. Non-limiting examples of provider services that may be invoked or accessed to work in conjunction with the IoT platform include: security services 432 that maintain and apply security policies, access controls, and the like, encrypt and decrypt information, create secure transmission (e.g., TLS) channels, etc.; messaging services 434 that transmit triggering events and other notifications between subscribing users and services, and or/provide queueing services for prioritizing synchronous and asynchronous operations (e.g., API calls); monitoring services 436 that monitor network activity and computing resource usage and generate logs 442 of activity; data storage services 438 that maintain distributed storage devices, databases, etc., and that may maintain and/or obtain data stored in an IoT device data store 464; and, data analytics services 440 that may collect data (e.g., aggregated sensor data) and perform analytics on the data, such as machine learning, trend analysis, general monitoring/alerting, etc.

Figure 5:
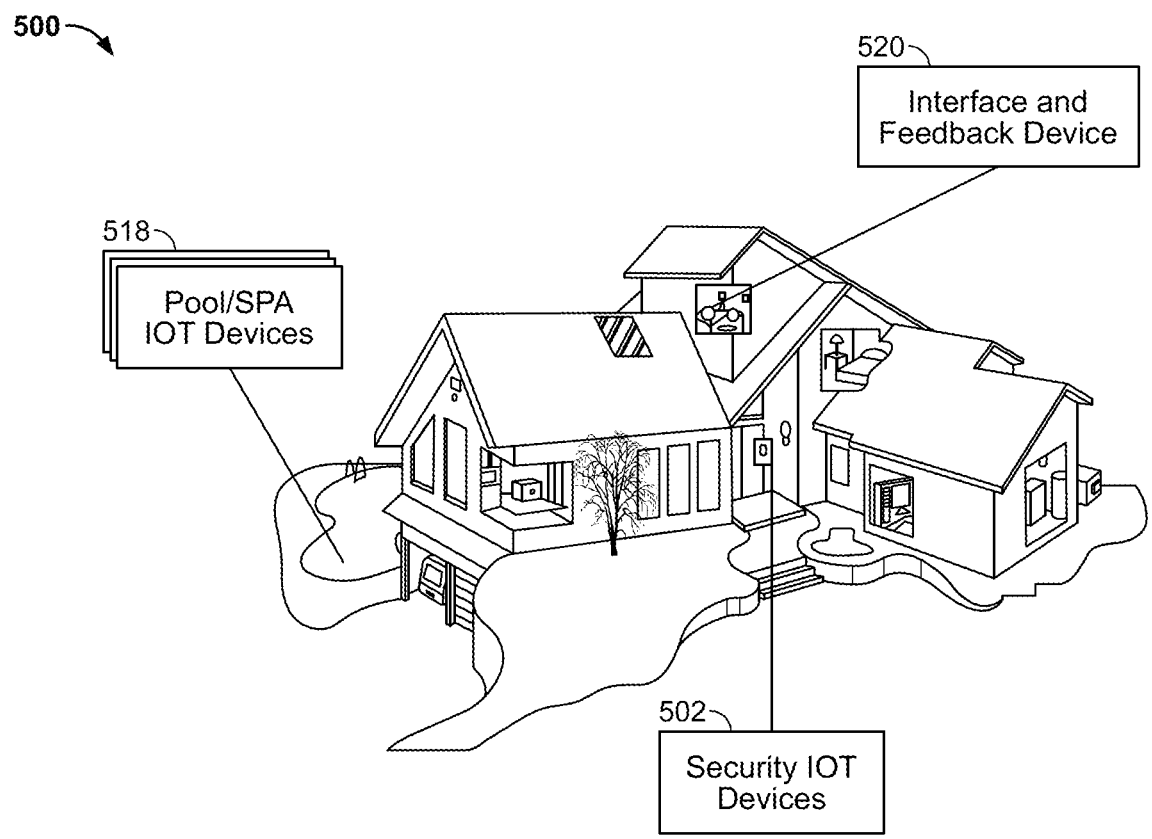
FIG. 5 is a diagram of an example deployment including embodiments of the invention, illustrating a connected residence.

FIG. 5 is a diagram 500 of an example IoT device deployment at a residence in order to create a set of connected objects around the home. The illustrated example IoT devices for connecting to certain objects are not limiting, but are demonstrative of a "smart home" concept where the status can be monitored, and/or operations controlled, for residential devices and systems that historically could only be monitored and controlled manually. Additionally, using the IoT platform described above, together with user interactions and feedback, data from different types of objects and IoT devices may be collected, aggregated, and analyzed to identify previously unknown optimizations, synergies, impacts, and cooperative functionalities between objects in the home. In the illustrated example, the IoT devices may be natively included as a component of the corresponding connected object, or may be retroactively connected (e.g., via sensors and control interfaces as described above) to an unconnected object to connect that object to the IoT platform.

Non-limiting example IoT devices in the diagram 500 include: security IoT devices 502 that monitor home activity, such as smart doorbells, indoor and outdoor video cameras, security/alarm systems, etc.; fixture IoT devices 504 for connecting to "analog" home fixtures, such as faucets and other plumbing; appliance IoT devices 506 for connecting to in-home appliances such as televisions, washers and dryers, refrigerators, dishwashers, garbage disposals, coffee makers, etc.; HVAC IoT devices 508 for connecting to air conditioning units, heating units, vents, etc.; water supply IoT devices 510 for connecting to water heaters, water softeners, water filtration systems, water and sewer pipes, sump pumps and other water pumps, etc.; interior environmental sensor devices 512 such as motion detectors, light detectors, sound detectors, smoke detectors, carbon monoxide detectors, thermostats, etc.; exterior sensor devices 514 such as light and motion detectors, rain sensors, wind sensors, etc.; irrigation IoT devices 516 for connecting to watering system control panels, valves, water lines, areas of earth/soil, etc.; and, pool and spa IoT devices 518 for connecting to pool controls, pool pumps, pool lights, the pool/spa itself, etc. Some or all of the IoT devices 502-518 may collect and send data to a gateway, router, or base station in the home, or directly to a cloud-based server; configuration and control commands may be transmitted in the opposite direction.

The deployment may further include one or more IoT platform interface/feedback devices 520, such as a resident's desktop PC or smartphone having software or a browser interface executing thereon to access the IoT platform and monitor, configure, control, add, remove, change, and perform other management operations on the IoT devices 502-518 and/or interact with collected and analyzed data. The IoT platform may further include a vehicle IoT system 530 installed in the resident's vehicle. In some embodiments, the installation may include a user interface similar to that of the feedback device 520, installed on a computer of the vehicle and presented, e.g., on a navigation screen or another display device. Additionally or alternatively, the vehicle IoT system 530 may include one or more IoT devices that monitor and/or control various properties of the vehicle, such as motor speed and temperature, fuel/battery level, interior temperature, ignition, etc.

Figure 6:
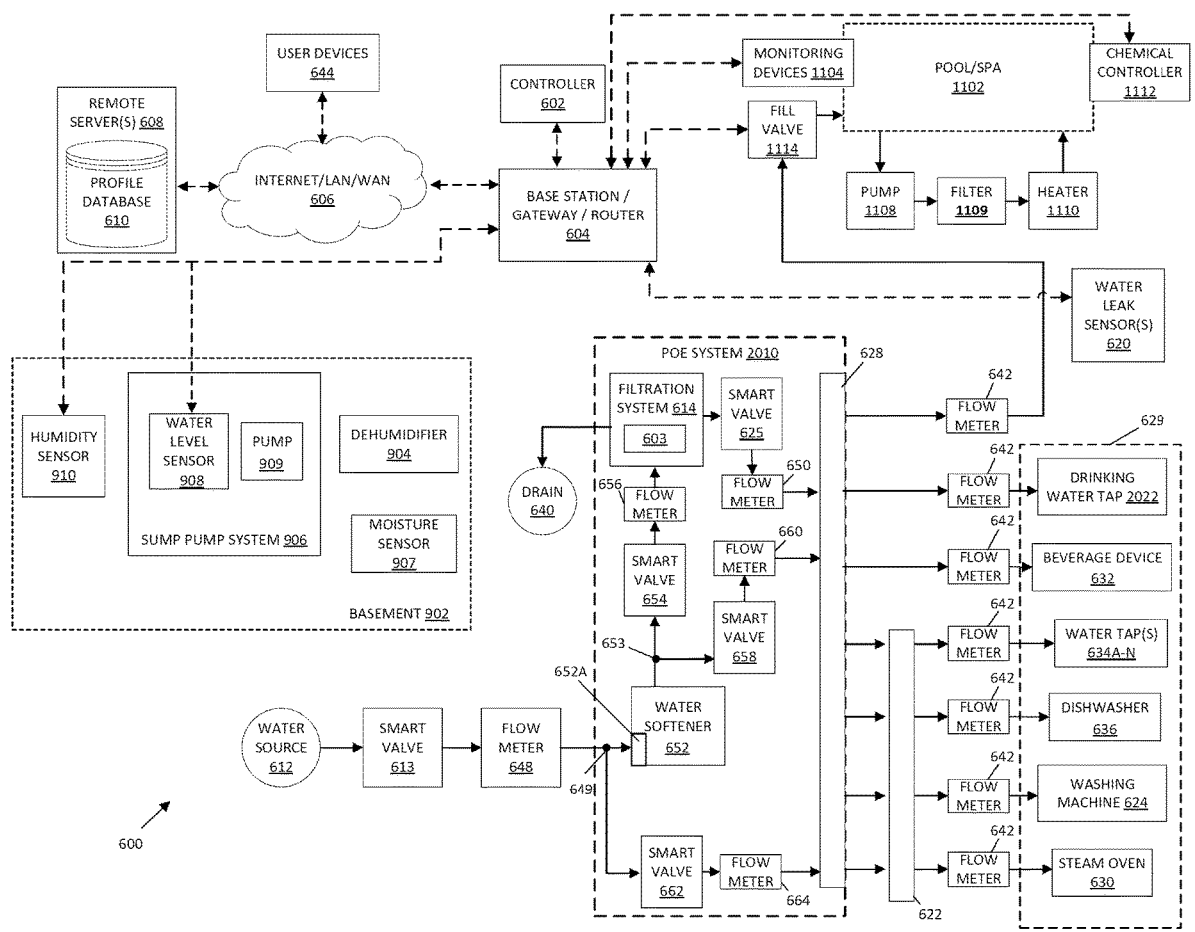
FIG. 6 is a block diagram of an example embodiment of a communication system for water systems including a water point-of-entry system, a water softener system, a water filtration system, water-using appliances, a pool/spa system, and a subterranean water removal system.

FIG. 6 shows an illustrative system 600 that enables the monitoring, performance evaluation, and control of connected devices in a residential water system. The system 600 may include one or more network-enabled devices (e.g., which may each include or correspond to an IoT device such as the IoT device 200 of FIG. 2) including without limitation: a controller 602; smart valves (e.g., valves 613, 625, 654, 658, and 662); flow meters (e.g., meters 642, 648, 650, 656, 660, and 664); manifolds 628; pumps; filters; monitoring devices 1104 and sensors 907, 910, 2034; integrated systems such as a water filtration system 614, a water softener system 652, and a sump pump system 906; water-using appliances 629; and other water system components that can be network-enabled as described herein. For example, in some embodiments the system 600 may include any network-enabled component of the water system and any of its subsystems, such as water subsystems dedicated to management of water at a residential feature (e.g., a pool/spa 1102), or within an area of the residence (e.g., a basement 902), or at a particular point in the flow of water through the water system. For example, the system 600 can include a point-of-entry (POE) system 2010 (and any integrated systems and/or components thereof) at a point-of-entry where feed water (i.e., from a municipal source, well, or other water source 612) enters the residential water system.

The system 600 may further include one or more remote servers 608, one or more user devices 644, a gateway 604 (e.g., gateway 320 of FIG. 3), which may be alternatively referred to as a base station or a router, and a network 606, which may be a LAN, WAN, or the internet. The gateway 604 may route data (e.g., including commands, messages, sensor data, profile data, alerts, or other applicable information) locally between the network-enabled devices of the system 600 that are in direct communication with the gateway 604, and globally between local devices and remote devices via the network 606. One or more user devices 644 and one or more remote servers 608 may be communicatively coupled to the gateway 604 via the network 606. The user devices 644 may include personal computers, tablets, smart phones, etc. In some embodiments, at least a portion of water-using appliances 629 in the system 600 may be network-enabled devices that are communicatively coupled to the gateway 604. The controller 602 may be in direct communication with the gateway 604 in order to access data at the gateway 604, send commands to the various network-enabled devices (or a specific one or more of the devices), exchange communications with remote servers 608 and/or user devices 644, etc. Alternatively, the controller 602 may communicate directly with some or all of the network-enabled devices.

A smart valve 613 and a flow meter 648 may be coupled between a node 649 and the output of a water source 612, which may be, for example, the main water line into a building such as a residence or business, an output of a water softener, or an output of a hot water heater. For example, the smart valve 613 can be, or can connect to, a municipal water meter with an integrated controller. The smart valve may selectively enable and disable the flow of water into the system 600. The flow meter 648 may measure the flow rate of water passing through it and may generate corresponding flow rate data. The flow meter 648 may be communicatively coupled to the gateway 604 and may thereby transmit flow rate data to the controller 602 or remote servers 608. The smart valve 613 may be communicatively coupled to the gateway 604 and may receive commands from the controller 602, which set the state (e.g., open or closed) of the smart valve 613. The node 649 may split the flow of water output from the flow meter 648 (e.g., with a pipe fitting that splits the flow of water) between an input of the water softener system 652 and an input of a manifold 628. A smart valve 662 and a flow meter 664 may be coupled between the node 649 and an input of the manifold 628, and may operate similarly to the smart valve 613 and the flow meter 648, respectively, to monitor and control the flow of input water into the manifold 628.

The system may include one or more water leak sensors 620 disposed in (an) area(s) of the building in which leaks may be likely to occur (e.g., in the kitchen, laundry room, or bathroom). The water leak sensor 620 may be, for example, a moisture sensor which, upon coming in contact with moisture, sends an alert to the controller 602 via the gateway 604 to indicate that a leak has been detected. In response to this alert, the controller 602 may cause an alert to be sent (e.g., in the form of a push notification or a text message) to one or more of the user devices 644 via the gateway 604 and the network 606. In some embodiments, in response to being alerted to the presence of a leak, the controller 602 may cause various valves to close to mitigate the leak. For example, the smart valve 613 at the inlet to the building may be closed, blocking the flow of all water into the building. In other embodiments, the alert provided by the water leak sensor 620 may indicate a particular area of the building in which the leak has occurred, and the controller 602 may instruct the manifold 628 and/or the water heater 622 to close valves at outputs coupled to appliances in the indicated area. For example, if a leak is detected in the kitchen, the controller 602 may instruct the manifold 628 and/or the water heater 622 to block their respective outputs that are coupled to a water tap 634A in the kitchen, and to the dishwasher 636. As another example, if a leak is detected in the laundry room, the controller 602 may instruct the manifold 628 and/or the water heater 622 to block their respective outputs that are coupled to the washing machine 624.

The water softener system 652 may be coupled to receive water from one of the two outputs of the node 649. The water softener system 652 may, for example, be an ion exchange system (e.g., a sodium ion exchange system) that reduces the mineral content (e.g., the calcium and magnesium content) of water passing through it to produce "softened" water. In some embodiments, the water softener system 652 may include an internal flow meter and smart valve 652A at its input and/or output, so that the flow of water through the water softener system 652 may be measured and controlled. The input valve 652A of the water softener 652 may be selectively opened and closed by the controller 602 and/or an integrated controller of the water softener 652. In this way, the flow of softened water into the building may be selectively blocked (e.g., when a leak is detected by the water leak sensor 620 or any other applicable leak detection mechanism). The controller 602 may communicate with the water softener 652 or a processor thereof to control the amount of water softening agent (e.g., salt) that the water softener applies to the water it receives from the flow meter 648.

In some embodiments, one or more measures of efficiency of the water softener system 652 may be determined by comparing the input flow rate of the water softener system 652 to the output flow rate of the water softener system 652 or by comparing the total amount of water input to the water softener system to the total amount of water output by the water softener system. However, in some embodiments, the flow rate at the input of the water softener may be calculated (e.g., by a processor of the controller 602) as a difference between the flow rate measured by the flow meter 648 and the flow rate measured by the flow meter 664. Somewhat similarly, the flow rate at the output of the water softener may be calculated as a sum of the flow rate measured by the flow meter 656 and the flow rate measured by the flow meter 660. The output of the water softener system 652 may be coupled to a node 653, which may split the flow of softened water output by the water softener system 652 between an input of the water filtration system 614 and an input of the manifold 628. A smart valve 654 and a flow meter 656 may be coupled between the node 653 and the input of the water filtration system 614, and may operate similarly to the smart valve 613 and the flow meter 648, respectively, to monitor and control the flow of softened water into the filtration system 614. A smart valve 658 and a flow meter 660 may be coupled between the node 653 and an input of the manifold 628, and may operate similarly to the smart valve 613 and the flow meter 648, respectively, to monitor and control the flow of softened water into the manifold 628.

In an alternate embodiment, the smart valve 613 may be omitted and the output of the flow meter 648 may be coupled only to the water softener 652, such that the water softener 652 is the only source of water provided to the manifold 628.

In this alternate embodiment, the flow of water into the building may be shut off by closing an input valve 652A of the water softener 652 in response to the detection of a leak. For example, the water leak sensor 620 may send an alert to an on-board controller of the water softener 652 through the gateway 604 indicating that a leak has been detected and, in response, the on-board controller may instruct the input valve 652A to close.

The water filtration system 614 includes water-filtering components working in concert to receive softened or unsoftened water and produce filtered water for drinking and other applications. In some embodiments, the water filtration system 614 uses a combination of reverse osmosis (RO) water filtration and activated carbon water filtration. However, it should be understood that other types of water filtration may be used in combination with or instead of these filtration methods. In such alternate embodiments, the water filtration system 614 may perform ionization, ultraviolet filtration, or infrared filtration. Non-limiting example water-filtering components include a pre-filter, controllable relays (i.e., pipes between different components, having controllable valves), a carbon filter, a membrane, a post filter, and a storage tank. Other embodiments of a water filtration system 614 may include additional or substitute components; for example, controllable relays are typically interconnecting pipes with valves, but may instead be fluid connectors, or a fluid manifold system, or a piston and valve system. An input of the water filtration system 614 (e.g., into the pre-filter; into the relays) may receive water from an output of the flow meter 656. While shown here to be external to the water filtration system 614, in alternate embodiments the smart valve 654 and/or the flow meter 656 may be internal components of the water filtration system 614.

In some embodiments, the water filtration system 614 may include an integrated or otherwise dedicated controller 603, and one or more of the water filtration system 614 components (including the smart valve 654 and/or the flow meter 656, in some embodiments) may be an IoT-enabled or otherwise connected device that communicates with and may be controlled by the controller 603. For example, some or all of the pre-filter, the carbon filter, the membrane, the post-filter, and other water-filtering components may include on-board diagnostic systems or may be coupled to a diagnostic system of the water filtration system 614; the controller 603 may include (or a processor thereof may implement) a diagnostic module, which may function as such a diagnostic system. The diagnostic system may periodically perform diagnostic checks to determine the status (sometimes referred to herein as the "filter status") of these components of the water filtration system 614. The determined status may include filter information such as the last time a given filter was changed, whether the given filter has been changed since the last time a diagnostic check was performed, whether a mechanical failure has occurred in the given filter, such as plugging (e.g., indicating that the filter has reached the end of its useful life), black water (e.g., where activated carbon from the filter cartridge enters the water stream), or leaks (e.g., which may be identified as water pressure drops across the filtration system 614). The controller 603 may be an IoT device (e.g., IoT device 200 of FIG. 2) communicatively coupled to the gateway 604, and may control the operation of the relays, thereby controlling the flow of fluids through the water filtration system 614.

A portion of the input water, referred to herein as permeate or filtered water, may pass through the filtration system 614 for distribution, leaving behind most (e.g., 95%-99%) of the solids originally contained within the input water (e.g., salt or other minerals) referred to herein as concentrate. The concentrate may be routed to a drain 640 via a concentrate outlet of the membrane. The permeate may be passed to an input of a manifold 628 for subsequent use in various water appliances 629, or may be stored in a storage tank for future on-demand use. The storage tank may also be a connected device; for example, the storage tank may include a water level sensor that detects when the storage tank is full. In response, the water level sensor may send data to the controller 603 indicating that the storage tank is full. The controller 603 may then control the relays to stop the flow of water through the water filtration system 614 until the water level sensor detects that the storage tank is no longer full. Alternatively, the controller 603 may send data to the controller 602 indicating that the storage tank is full and, in response, the controller 602 may close a selected one of the smart valves 613, 652A, 654 in order to block the flow of water into the water filtration system 614.

A smart valve 625 may be coupled between the water filtration system 614 and the manifold 628 so that the flow of water into the manifold 628 from the water filtration system 614 may be selectively enabled and disabled. In some embodiments, a flow meter 650 may be coupled between the smart valve 625 and the manifold 628 and may measure the flow rate of water passing between the two components. The flow meter 650 may be communicatively coupled to the gateway 604 and may thereby transmit flow rate data to the controller 602 or remote servers 608. The smart valve 625 may be communicatively coupled to the gateway 604 and may receive commands from the controller 602, which set the state (e.g., open or closed) of the smart valve 625. These commands may be automatically generated or may be generated in response to user input provided to the controller 602 from the user devices 644 via the network 606 and the gateway 604. While shown here to be external to the water filtration system 614, in alternate embodiments the smart valve 625 may be an internal component of the water filtration system 614 and may be controlled by the controller 603.

A manifold 628 may be a network-enabled smart manifold, having controllable valves at each of its inputs and outputs so that the flow of water through the manifold 628 may be selectively controlled. For example, any selected output of the manifold 628 may be supplied with a selected water type—unsoftened and unfiltered output from the flow meter 664, softened and unfiltered output from the flow meter 660, or softened and filtered output from the flow meter 650. In other embodiments, the system 600 may include multiple manifolds 628, each connecting certain types of water to certain endpoints. For example, the POE system 2010 may include a discrete manifold 628 for distributing each of the input water, the softened water, and the filtered water; additionally or alternatively, the POE system 2010 may include a first manifold 628 connecting to the water appliances 629, and a second manifold 628 connecting to the first manifold 628, a water heater, and a fill valve 1114 of the pool/spa 1102. A network-enabled controller (e.g., IoT device 200 of FIG. 2) may be included in or coupled to the manifold 628, enabling remote and automatic control of the manifold 628 via a wired or wireless connection to the base station/gateway/router 604. In some embodiments, when the system 600 includes multiple manifolds 628, each manifold 628 may be its own separately-addressable device, having a dedicated controller communicating with the gateway 604 or with a routing-capable controller maintaining its own network address table (NAT) for the manifolds 628.

The water appliances 629 may, for example, include a steam oven 630, a beverage device 632, one or more water taps 634A,B, . . . , N (i.e., leading to the N faucets in the residence) and/or separate drinking water taps 2022, a dishwasher 636 and/or other applicable appliances, such as a washing machine 624. Network-enabled flow meters 642 may be interposed between the manifold 628 and the water appliances 629. Each of the flow meters 642 may include or may be coupled to a network-enabled controller (e.g., IoT device 200 of FIG. 2) by which the flow meters 642 may be communicatively coupled to the gateway 604. The flow meters 642 may monitor the flow rates of water passing between each of the outputs of the manifold 628 and the water appliances 629, and may communicate corresponding flow rate data to the controller 602 through the gateway 604. Each sampling of flow rate data from the flow meters 642, 648, 650, 656, 660, and 664 may be referred to herein as a "data capture" or "flow rate data capture". From this flow rate data, the controller 602 may identify potential leaks or misuse of filtered water, and may assess the total water consumption and/or the consumption of softened or filtered water as compared to other equivalent homes or businesses in the same area, as will be explained below.

Another prevalent concern among home and business owners is the prevention of flooding in rooms located below ground and, in particular, those located near or overlapping the water table. Such rooms often require a sump pump to route water that has collected in the room out of the building. Thus, the system 600 may include subsystems and components through which water accumulation (e.g., flooding) in a basement 902 may be detected and appropriate mitigating action taken. The system 600 may include devices and systems located in the basement 902, such as a dehumidifier 904, a sump pump system 906, a moisture sensor 907, and a humidity sensor 910. The sump pump system 906 may be a submersible sump pump system that includes a water level sensor 908 and a pump 909. Each of the dehumidifier 904, the moisture sensor 907, the water level sensor 908, the sump pump 909 and the humidity sensor 910 may include or be coupled to a network-enabled controller (e.g., IoT device 200 of FIG. 2) that enables communication between these devices and the gateway 604.

The water level sensor 908 may be a buoyant float sensor such that as the water level in the basement rises the water level sensor 908 or a component thereof may be lifted with respect to the rest of the sump pump system 906. Once the water level sensor 908 exceeds a predetermined threshold height, the water level sensor may, upon exceeding the threshold height, send a signal to the controller 602 or to one of the remote servers 608 via the gateway 604; the controller 602 or remote servers 608 can then verify the validity of the signal before sending an instruction to the sump pump 909 to begin pumping. In some embodiments, multiple predetermined threshold heights may be set for the water level sensor 908. For example, lower, middle, and upper thresholds may be defined. When the water level sensor 908 rises above the middle threshold, a first alert is sent to the controller 602 or the remote servers 608, indicating that the sump pump 909 should be turned on. When the water level sensor 908 rises above the upper threshold, a second alert is sent to the controller 602 or the remote servers 608, indicating a malfunction of the sump pump 909 has likely occurred as the rate of water accumulation in the basement 902 has exceeded the ability of the sump pump 909 to remove water from the basement 902. When the water level sensor 908 falls below the lower threshold, a third alert is sent to the controller 602 or the remote servers 608, indicating that the sump pump should be turned off as the water level has sufficiently receded. It should be noted that, in this example, the controller 602 or the remote servers 608 make the ultimate determination of whether to turn the sump pump on or off. In some embodiments, this determination may be made based on an analysis of the validity of the signals received from the water level sensor 908, for example, based on indicators received from the moisture sensor 907 and/or the humidity sensor 910, as will be described below.

If a processor of the controller 602 or the remote servers 608 determines, based on signals received from the water level sensor 908, that the water level in the basement 902 has exceeded a predetermined threshold (e.g., the middle threshold), the processor may instruct the sump pump system 906 to begin pumping water out of the basement 902. Additionally, the processor may instruct the dehumidifier 904 to turn on in order to begin dehumidifying the basement 902. If the processor subsequently determines that the water level has exceeded a second, higher predetermined threshold (e.g., the upper threshold), this may be indicative of the sump pump malfunctioning. In response to identifying a sump pump malfunction, the processor may cause an alert to be sent to one or more of the user devices 644. Additionally, if automatic maintenance service requests have been enabled by the home or business owner (e.g., via a user interface accessed using one of the user devices 644), the processor may be configured to automatically contact a maintenance service (e.g., a plumber or repair service) to schedule repair of the sump pump in response to the detection of a malfunction of the sump pump. The processor may further be configured to notify the home or business owner of the time and date of the scheduled repair by sending a text message or push notification to one or more of the user devices 644.

Water level sensors of sump pump systems, such as the water level sensor 908, may occasionally malfunction (e.g., as a result of the water level sensor getting stuck or accumulating grime or residue that blocks electrical contacts of the sensor) so that water accumulation in the basement remains undetected by the sensor or so that the water level sensor falsely detects water accumulation even when no water is present. Thus, it may be desirable to have alternative systems in place for detecting water accumulation in the basement 902 so that water accumulation may still be detected even in the event of such malfunctions. These alternative systems may also be used to verify whether flooding detected by the water level sensor 908 is actually occurring, or whether the signal output by the water level sensor is a false positive.

For example, the moisture sensor 907 may be a secondary water detection device disposed in the basement 902 (e.g., attached to or placed on the floor of the basement near the sump pump system 906). The moisture sensor 907 may be a spot leak detector, an under-carpet leak detector, a hydroscopic tape-based sensor, or a rope-type sensor, for example. If the moisture sensor 907 detects water, it may send an alert to the controller 602 or to the remote servers 608 via the gateway 604. As another example of an alternative device for water accumulation detection and verification, a humidity sensor 910 may be disposed in the basement 902. The humidity sensor 910 may include a capacitive sensor, a resistive sensor, and/or a thermal conductivity sensor for measuring ambient humidity. The humidity sensor 910 may detect the humidity level of the basement 902. If the humidity level exceeds a predetermined threshold, the humidity sensor 910 may send an alert to the controller 602 or to the remote servers 608 via the gateway 604. In some embodiments, the controller 602 may instruct the dehumidifier 904 to turn on in response to receiving the alert from the humidity sensor 910. In some embodiments, the humidity sensor 910 may instead send humidity data to the controller 602, indicative of the humidity level in the basement 902. The controller 602 may then determine the humidity level based on the humidity data, and may compare the humidity level to the predetermined threshold in order to determine whether to activate the dehumidifier 904 on the basis of excessive humidity.

A processor of the controller 602 or the remote servers 608, upon receiving alerts from both the moisture sensor 907 and the humidity sensor 910 (e.g., or otherwise determining that the humidity level of the basement 902 exceeds the predetermined threshold in combination with receiving the alert from the moisture sensor 907), may instruct the sump pump system 906 to begin pumping water out of the basement 902, even if the water level sensor 908 has not yet detected water accumulation there. In this way, the sump pump system 906 may still operate to remove accumulated water from the basement 902, even if the water level sensor 908 has malfunctioned. The processor may refrain from turning on the sump pump system 906 if the water level sensor 908 indicates flooding, but the processor has not received alerts from the moisture sensor 907 or the humidity sensor 910, as this scenario may be assumed to correspond to a false positive reading of the water level sensor 908.

In some embodiments, if the humidity sensor 910 and the moisture sensor 907 indicate water accumulation in the basement 902 and the water level sensor 908 does not, in addition to turning on the sump pump system 906, the processor may cause a push notification or text message to be sent to one or more of the user devices 644 by a processor of the controller 602 or of the remote servers 608 in order to inform the home or business owner that the water level sensor 908 may be malfunctioning and should be checked. In some embodiments, the processor may determine, upon receiving alerts from the water level sensor 908 but not from either of the humidity sensor 910 or the moisture sensor 907, that the water accumulation detected by the water level sensor 908 corresponds to a false positive. In response, the processor may cause a push notification or text message to be sent to one or more of the user devices 644 by a processor of the controller 602 or of the remote servers 608 in order to inform the home or business owner that the water level sensor 908 may be malfunctioning and should be checked. Additionally, if automatic maintenance service requests have been enabled by the home or business owner (e.g., via a user interface accessed using one of the user devices 644), the processor may be configured to automatically contact a maintenance service (e.g., a plumber or repair service) to schedule repair of the water level sensor 908 in response to the detection of a malfunction thereof. The processor may further be configured to notify the home or business owner of the time and date of the scheduled repair by sending a text message or push notification to one or more of the user devices 644.

The controller 602 may be implemented as a network-enabled device in the home, or may be implemented as part of a cloud-based architecture. For example, in a cloud-based implementation of the controller 602, the functions of the controller 602 may be performed by a dedicated module running on the remote servers 608, which may eliminate the need for a physical controller to be installed in the home or business of the user. In one embodiment, the controller 602 may be a central control hub, which may include a processor, volatile and non-volatile memory, a user interface, and network interface circuitry. The controller 602 or the remote servers 608 may communicate with the controllers of network-enabled components automatically or in response to manual user commands (e.g., provided at the user interface of the controller 602 or by one of the user devices 644).

The data processing components of the system 600, such as the controller 602, can be configured to establish a feedback loop in which data reported from a first subsystem or component is used to identify a problem or other operating condition, and commands are issued to a second subsystem or component to cause the second subsystem/component to perform a function that addresses the problem/condition. In some embodiments, the controller 602 or the remote servers 608 can automatically maintain the feedback loop: the controller 602 or remote servers 608 process data reported from various network-enabled components of the system 600 to determine a state or other operational characteristics of the first subsystem/component; the controller 602 or the remote servers 608 can, based on the determined state/characteristics, send commands to the second component/subsystem to change that component/system to another state. For example, the controller 602 can detect that a sump pump 909 in the basement 902 has activated, and can automatically send a command to a dehumidifier 904 in the basement 902 to also activate. In some embodiments, the controller 602 or the remote servers 608 can obtain approval from the user (e.g., via an interface of the controller 602 or user device 644) before sending the command(s) to the second subsystem. Additionally, a feedback loop may be maintained for an extended period, while the controller 602 collects operational data of the first subsystem; this operational data can be used to determine whether operating characteristics of the first and/or second subsystem are optimized. For example, the controller 602 may implement a normal dishwasher operating condition where a first type of water (e.g., untreated input water, or a first type of softened and/or filtered water that is treated using a first set of treatment parameters) is supplied to the dishwasher for dish washing operations; the controller 602 may enter an optimization mode in which it causes a second type of water (e.g., softened and/or filtered with a different set of treatment parameters than the first set) to be supplied to the dishwasher, and may collect operational data and compare it to the normal-mode operational data to determine if the dishwasher operation is optimized.

The controller 602 may further instruct the water heater 622 to block each of its outputs other than the output coupled to the dishwasher 636. At this stage, the kitchen tap 634A, the drinking water tap 2022, and the washing machine 624 are cut off from the water softener 652 by the manifold 628 and the water heater 622, so that they are unable to receive the second type of (e.g., oversaturated softened) water. The dishwasher 636 may then perform standard dishwasher operations or a customized self-cleaning operation, which may be made more effective due to the softened water used in the operation being oversaturated with softening agent. In general, controlling the precise salt level for the water supplied to each appliance may be used to extend the life of each appliance.

Figure 7:
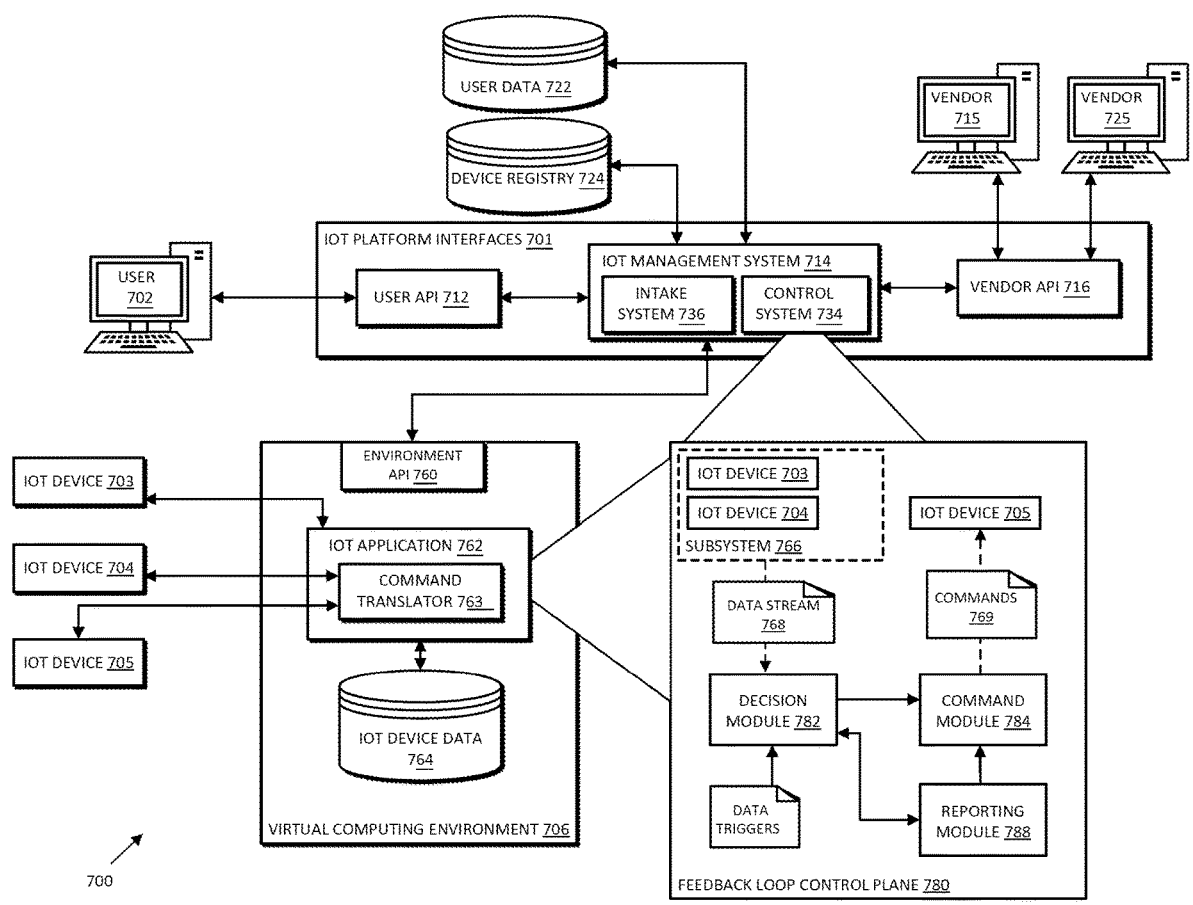
FIG. 7 is a block diagram of an example embodiment of yet another computing environment in accordance with some embodiments of the invention.

FIG. 7 illustrates an example system 700 that, like the system 400 of FIG. 4, implements a computing environment for various users to, via communications with an IoT management system 714, connect one or more IoT devices 703, 704, 705 to an IoT application 762 executing in a virtual computing environment 706. FIG. 7 illustrates an example system in which an IoT application 762 (as described above with respect to FIG. 4) or a control system 734 of the IoT management system 714, alone or in cooperation with each other, implement a feedback loop control plane 780. The IoT devices 703, 704, 705 connected to the IoT management system 714 via the IoT application 762 may each be connected to a different component of a water subsystem, and may belong to the same or different subsystems of the water system, as described above. In some embodiments, the control plane 780 may include groupings of the IoT devices 703-705 into one or more groups according to the subsystem(s) to which they belong. For example, a first IoT device 703 may be a temperature sensor submerged in (or associated with) the swimming pool, and a second IoT device 704 may be provided within or connected to a pool pump for the pool. The control plane 780 may include the two IoT devices 703, 704, among others, in a subsystem 766 for the swimming pool.

An IoT device may generate data according to its normal operations, and some or all of the data may be received by the IoT application 762 and stored (e.g., in an IoT device data store 764), aggregated, transformed, or discarded. In the control plane 780, some or all of this data may be provided to a decision module 782. In some embodiments, the data produced by an IoT device 703 or a subsystem 766 including multiple IoT devices 703, 704 may be aggregated, compiled, reduced, and otherwise processed to produce a data stream 768 that is received by the decision module 782. Using one or more data triggers, the decision module 782 can determine whether a problem or a certain condition is detected in an IoT device 703 or a subsystem 766. A data trigger may be a threshold for a certain reported status parameter, a certain type of event message received, etc. For example, a data trigger may be a threshold solids content detected in a water filter; in another example, a data trigger may be an event message indicating a component has been activated or deactivated.

The decision module 782 can communicate with a command module 784 configured to communicate with one or more of the IoT devices. When a data trigger is met (i.e., triggered) by data identified in the data stream 768, the decision module 782 determines an action to be taken, based at least on the data trigger met, and sends information about the action to the command module 784. The information may identify the command(s) 769 to be issued and the IoT device(s) 705 to receive the command(s) 769; or, the information may be processed by the command module 784 to determine the command(s) 769 to issue to the IoT device(s) 705 or subsystem(s). The command module 784 can send the command(s) 769 to the IoT device(s) 705, which may execute the command(s) 769 in an attempt to remediate or otherwise address the problem/condition identified in the subsystem 766. In some embodiments, a command 769 may change the operational parameters of a component or subsystem outside of the subsystem 766 (e.g., IoT device 705).

The control plane 780 may further include a reporting module 788 in the feedback loop. The reporting module 788 may determine (e.g., based on user settings) whether and when to report collected data to the user. For example, the feedback loop may execute for a certain period of time, and the reporting module 788 may collect operational data in a report that, once the feedback loop stops executing, is sent to the user. In another example, the decision module 782 may notify the reporting module 788, before notifying the command module 784, that a data trigger has been met; the reporting module 788 may generate a notification to the user, receiving user input in response, and this user input may be delivered to the decision module 782 (e.g., indicating that no action should be taken) and/or to the command module 784 (e.g., identifying the command(s) 769 to execute).

Figure 8:
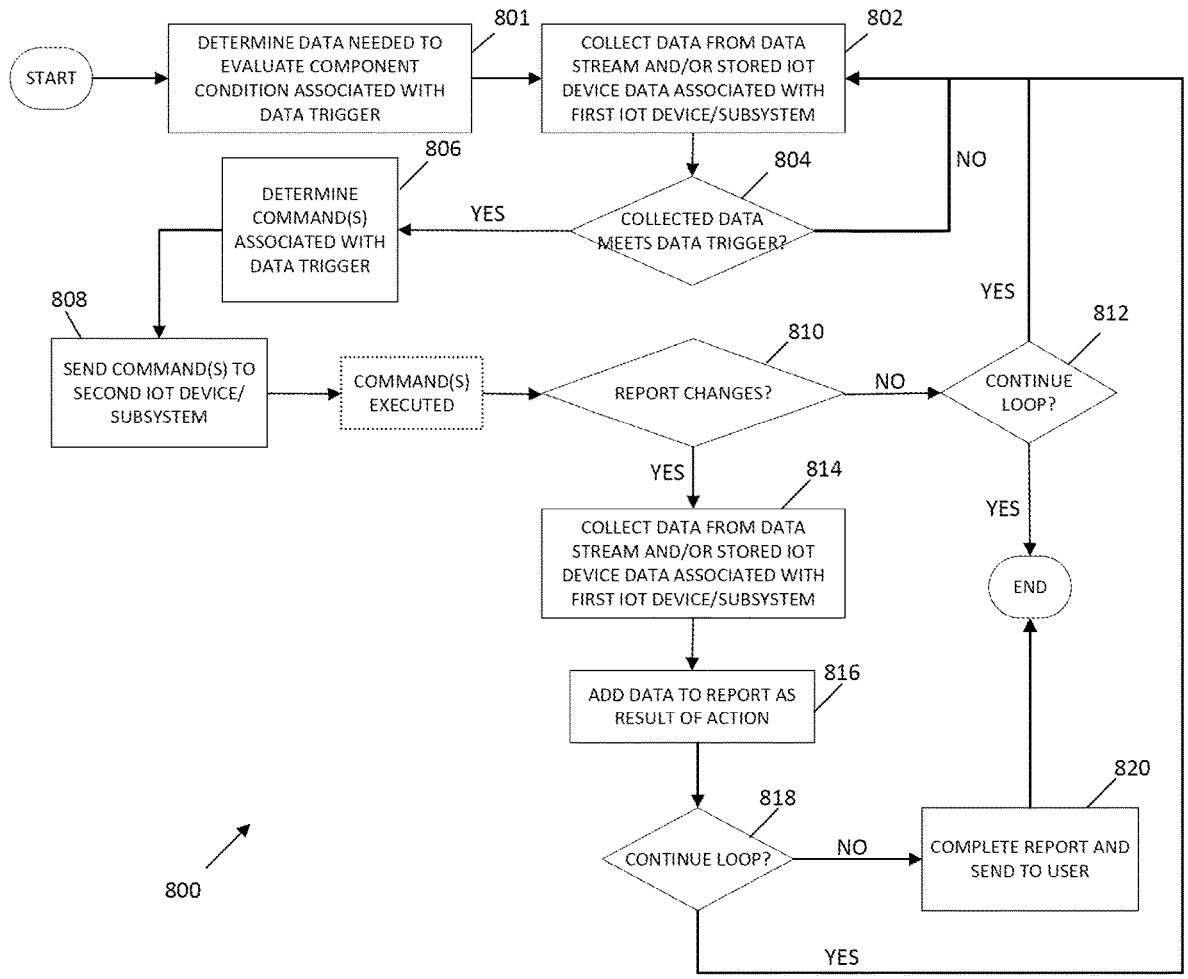
FIG. 8 is a flowchart of an example embodiment of a method of using a feedback loop to detect a problem or condition in a first water system component/subsystem and change operational parameters of a second water system component/subsystem to address the problem or condition in the first water system component/subsystem.

Referring to FIG. 8, an example method 800 of implementing a feedback loop may be executed by the control plane or another system. At 801, the system may determine, based on the parameters of one or more data triggers, which data should be obtained from the monitored device/subsystem in order to detect whether the problem/condition associated with the data trigger is present. At 802, the system collects the identified data from the data stream. At 804, the system determines whether the collected data "meets" the data trigger (e.g., does the data indicate a threshold is exceeded, or an event has occurred?). If not, the system returns to 802 to continue collecting data. If the data trigger is triggered, at 806 the system can determine which command(s) should be issued to the second (i.e., outside of the first) subsystem or IoT devices, based on the data trigger met. At 808, the system sends the command(s) to the second IoT device/subsystem, which then executes the commands. At 810, the system can determine whether user settings require a report of the automatically modified settings, or the resulting data, must be reported. If not, and the loop is to be continued (812), the system returns to 802. If the loop is not continued at 812, the evaluation is over.

If the operational changes and/or results are to be reported, at 814 the system can again collect data from the data stream of the first subsystem. The data sought is the same type as originally collected, but may have different values since the second subsystem commands were executed. At 816 the system can add the collected data and any other suitable data to a report data structure. At 818, if the loop is to be continued, the system returns to 802 (optionally using the data collected at 814 as the data collected at 802). If not, at 820 the system can send the report to the user.

Referring again to FIG. 7, in various implementations, a home or business network of IoT devices 703-705 may include the IoT devices 704, 705 from various manufacturers, using various (sometimes proprietary) formats and protocols for their communications. It would be advantageous for an IoT platform to enable a vendor (i.e., manufacturer, sales associate) of a "non-native" IoT device to add such device to the platform and configure the device to communicate with other devices in the network. The system 700 may provide IoT platform interfaces 701 including: a user API 712 that can be accessed by user devices 702 to exchange data with the IoT management system 714; and, a vendor API 716 that can be accessed by devices 715, 725 of various IoT device vendors to describe their IoT devices to the platform in a way that enables the platform to facilitate communications between the vendor IoT devices and other IoT devices on the platform. An intake system 736 can ensure that the proper information for translating between native platform operations and device-specific operations is provided via the vendor API 716; furthermore, the intake system 736 may obtain (via the API 716) parameters for execution functions of the vendor device that do not have an analogue in the slate of native platform operations. Additionally or alternatively to receiving the vendor device information via the API 716, the intake system 736 can obtain the information from other sources, such as internet databases, the device itself (e.g., via a firmware communication), or agents of the IoT platform.

The vendor device information may be formatted and then added to a device registry 724, such as a database or lookup table. The device registry 724 entries may be stored in a consistent format that enables a user (e.g., via the API 712) to select the proper device when adding the IoT device 704 to the device network. The device selection is passed, along with information for interpreting device-specific commands and status parameters, to the IoT application 762. Command translations between the native command format and the device-specific format may be performed by a command translator 763 of the IoT application 762.

Figure 9:
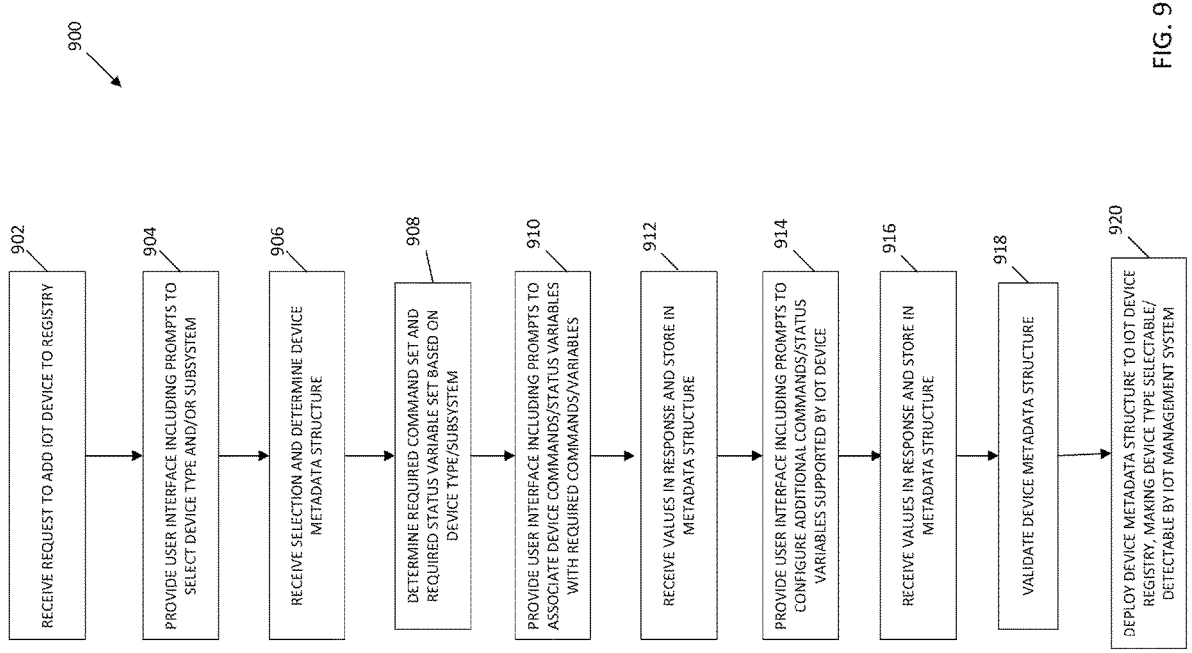
FIG. 9 is a flowchart of an example embodiment of a method of registering a type of network-enabled device so devices of the device type can be added to an IoT platform.

FIG. 9 provides a method 900 for the intake system or another system to add an IoT device of another vendor to the provider's IoT platform via a user interface. At 902, the system receives (e.g., via the vendor API) a request to add the IoT device. At 904, the system provides a user interface that enables the vendor to select the device type and/or the subsystem to which the vendor IoT device belongs. For example, the system may provide selections such as "variable speed pool pump," "water level sensor," "flow meter," etc. In some embodiments, the user interface may allow the user to select a subsystem (e.g., sump pump; pool/spa; water softening) and then select from predetermined device types of devices in that system. At 906 the system receives the selection(s) and determines, based on the device type, which metadata structure to use to represent the IoT device in the registry. Any type of water system device may have a corresponding template for the metadata structure, identifying essential and optional parameters for the particular functions that the device performs. In some embodiments, the templated structure identifies a set of status variables, including certain variables that any device of the device type must be able to report to the IoT application for analysis. Further, the templated structure may identify certain commands that the IoT device must be able to receive and execute.

From the appropriate templated structure, at 908 the system can determine from the metadata structure which status variables and commands are required for the device type. At 910, the system can provide another user interface (or update the displayed user interface) that guides the vendor to identify which of the vendor device's recognized commands and status variables are analogous to the required commands and status variables. At 912, the system receives the input associations and stores them in the metadata structure. At 914, the system may further provide a user interface that enables the vendor to identify and configure additional commands that the vendor device understands, and/or status parameters that the vendor device can report, even though these may have no analogue in the native platform language. At 916 the system receives the input data and stores it in the metadata structure. At 918, the system can validate the stored data in the metadata structure, such as by confirming that all required commands and status variables have been associated with a corresponding command/variable of the vendor device. At 920, the system can deploy the validated device metadata structure, such as by storing it in the device registry. In some embodiments, this allows the user to add an IoT device having the vendor's device type to the IoT infrastructure. Additionally or alternatively, the device registry entry can be used by the system to automatically detect and configure a vendor device when it is connected to the network.

Figure 10:
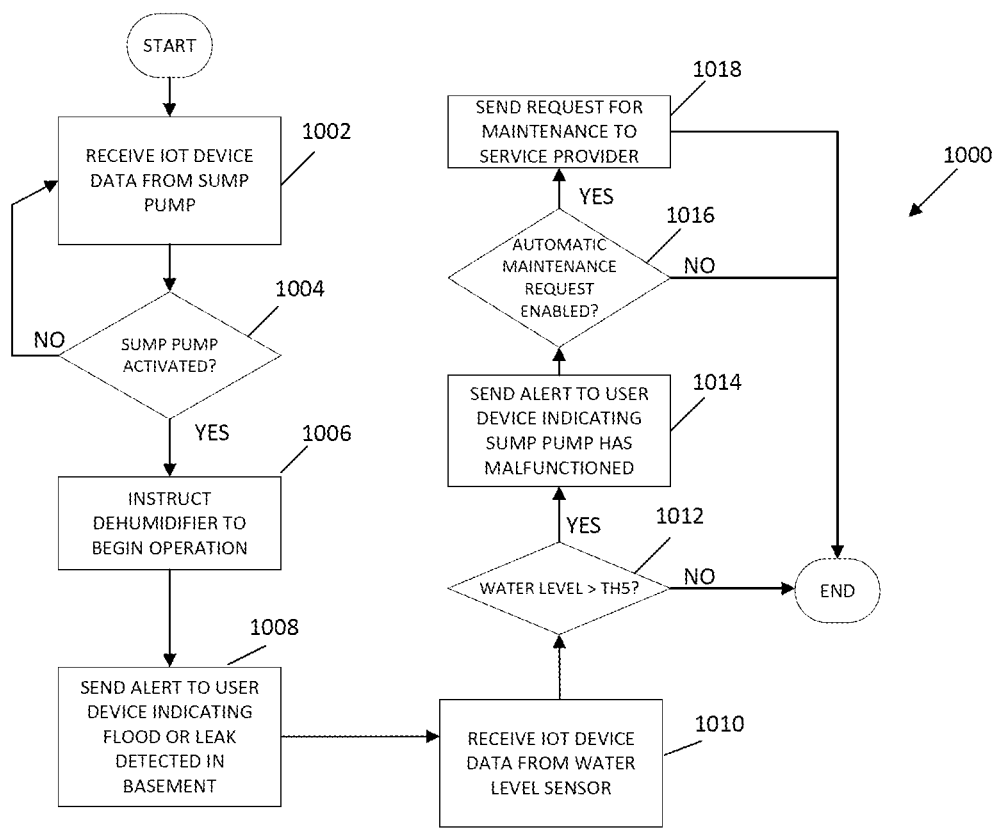
FIG. 10 is a flowchart of an example embodiment of a method that may control the operation of a sump pump and dehumidifier in response to detected operational changes.

To demonstrate the advantages of the present systems, such as the system 700 of FIG. 7, FIG. 10 shows an illustrative process flow for a method 1000 for the monitoring and control of the operation of a network-enabled sump pump system (e.g., the sump pump system 906 of FIG. 6). The method 1000 may be performed by executing computer-readable instructions stored in a memory of a controller (e.g., controller 602 FIG. 6) or a remote server (e.g., servers 608 of FIG. 6) with a processor of the controller or server. At step 1002, the processor may periodically receive IoT device data from a connected sump pump. The device data may include an indication whether the sump pump is activated, in some embodiments. Alternatively, the system may only receive device data from the sump pump when the sump pump is activated. At step 1004, the system parses the data to determine whether the sump pump is activated. If not, the system can return to step 1002.

If the sump pump is activated, the method proceeds to step 1006. At step 1006, the processor instructs a dehumidifier (e.g., dehumidifier 904 of FIG. 6) in the basement to turn on to begin dehumidifying the basement. Thus, in some embodiments, the processor may be configured to instruct the dehumidifier to turn on any time the sump pump is operating. The dehumidifier and the sump pump may, in some embodiments, be provided by different vendors/manufacturers, and the system may coordinate their operation using the command translator of the IoT application as described above.

At step 1008, the processor causes an alert to be sent (e.g., via the gateway 604 and/or network 606 of FIG. 6) to one or more user devices (e.g., the user devices 644 of FIG. 6) indicating that a flood or water leak has been detected in the basement (or another area associated with the sump pump for embodiments in which the sump pump is not disposed in a basement). For example, the alert may include a push notification sent by the processor to a software application running on the user device, a simple messaging service (SMS) message, or any other applicable text or voice alert capable of being output by the user device(s).

At step 1010, the processor may receive IoT device data from a water level sensor, the data representing the measured water level in the basement. At step 1012, the processor may analyze any alerts received from the water level sensor of the sump pump system. If the alerts indicate that the water level exceeds an upper threshold TH5, this may be indicative that the flooding or leak cannot be effectively corrected by the sump pump, either due to a malfunction of the sump pump. Thus, if the alerts provided by the water level sensor indicate that the water level has exceeded TH5, the method proceeds to step 1014 so that the home or business owner may be alerted to the malfunctioning of the sump pump. Otherwise, the method 1000 ends.

At step 1014, the processor sends an alert to the one or more user devices indicating that the sump pump has malfunctioned. For example, the alert may include a push notification sent by the processor to a software application running on the user device, a simple messaging service (SMS) message, or any other applicable text or voice alert capable of being output by the user device(s).

At step 1016, if automatic maintenance requests are enabled (e.g., as part of an opt-in or opt-out program), the method 1000 proceeds to step 1018. For example, automatic maintenance requests may be enabled by the home or business owner via a user interface of one of the user devices, and a record of whether the automatic maintenance requests have been enabled may be stored on the controller or the remote server. The maintenance requests may authorize the processor to automatically schedule the servicing or repair of the sump pump system with a service provider. The contact information for the service provider may be stored in a memory device of the controller or remote server, and may be user defined. If maintenance requests are not enabled, the method 1000 ends.

At step 1018, the processor retrieves the stored contact information of the service provider and then contacts the service provider to schedule repair of the identified leak. For example, the processor may cause a text message or e-mail to be sent to the service provider, or may call the service provider and play an automated message in order to request that the repair be scheduled. In some embodiments, the service provider may confirm the scheduling of the repair for a particular time and date, and in response the processor may send a text-based alert to one or more electronic devices of the user in order to inform the user of the time and date of the scheduled repairs.

Figure 11:
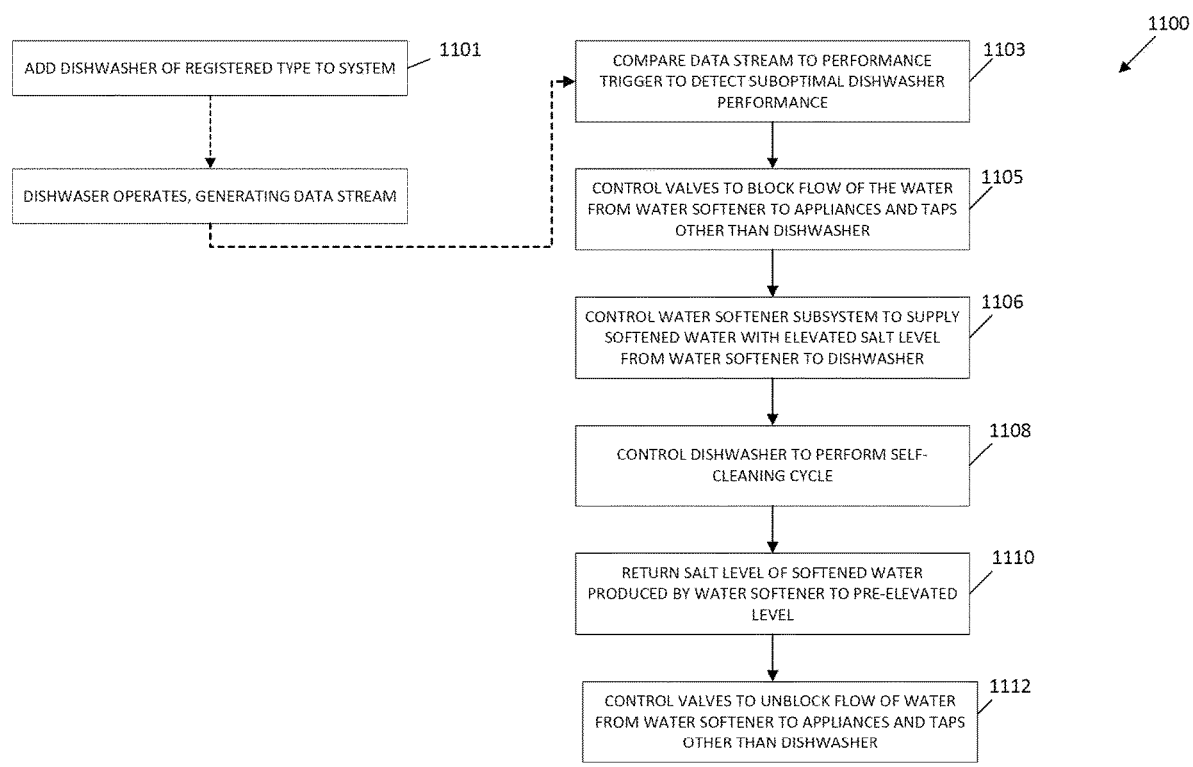
FIG. 11 is a flow chart of an example embodiment of a method of providing softened water with elevated salt levels to a dishwasher when the dishwasher performs a self-cleaning operation.

FIG. 11 shows an illustrative method 1100 by which a dishwasher (e.g., dishwasher 636 of FIG. 6) may perform a self-cleaning operation using softened water with an elevated salt level. At step 1101, the dishwasher may be added as an IoT device to the IoT device network as described above. The dishwasher may then operate for a time. At step 1103 the IoT application, or the dishwasher itself, detects that it is performing suboptimally and may send a corresponding alert to the processor of a controller indicating this suboptimal performance. In some embodiments, a user may provide input at a user interface of the dishwasher or a personal electronic device (e.g., user devices 644 of FIG. 6) indicating that the dishwasher is performing suboptimally and that self-cleaning should be performed.

At step 1105, the processor instructs valves of a manifold (e.g., manifold 628 of FIG. 6) and a water heater (e.g., water heater 622 of FIG. 6) to block the flow of softened water from any outputs of the manifold and water heater that are not coupled to the dishwasher. This avoids sending softened water with elevated salt levels to appliances or taps where it is not needed. In some embodiments, the processor may send an alert to a user device associated with the water system, indicating that water has been or will be turned off at certain points-of-use (e.g., corresponding to the closed manifold outputs) for a defined period of time due to dishwasher self-cleaning.

At step 1106, the processor instructs a water softener (e.g., the water softener 652 of FIG. 6) to begin supplying softened water with elevated salt levels to the dishwasher. At step 1108, the processor instructs the dishwasher to perform the self-cleaning operation. The dishwasher may send an alert to the processor indicating that the self-cleaning operation is complete. At step 1110, the processor instructs the water softener to adjust the salt levels of the softened water it produces to a previous, non-elevated level. At step 1112, the processor instructs the previously closed valves of the manifold and water heater to reopen, unblocking the flow of softened water to the corresponding appliances and taps. In some embodiments, the processor may cause an alert to be sent to the user device, indicating that the self-cleaning cycle of the dishwasher has been completed and/or that the valves have been reopened, such that water should now be available at the points-of-use that were not being supplied with water during the performance of the self-cleaning cycle by the dishwasher.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. Features of the systems described may be incorporated into/used in corresponding methods and vice versa.

For the sake of completeness, it is also stated that the term "comprising" does not exclude other elements or steps, the term "a" or "an" does not exclude a plurality, a single processor or other unit may fulfil the functions of several means recited in the claims and any reference signs in the claims shall not be construed as limiting the scope of the claims.

The invention claimed is:

1. A method comprising:
providing a water system with a control system and a first network-enabled device;
analyzing, by a control system, parameters of a data trigger to determine data to be collected from the first network-enabled device;
collecting, by the control system, the data from a data stream output by the first network-enabled device;
determining, by the control system, that the data trigger is met by the data;
determining, by the control system, commands associated with the data trigger;
sending, by the control system, the commands to a second network-enabled device to be executed;
generating, by the control system, a report; and
sending, by the control system, the report to a user device.

2. The method of claim 1, wherein the first network-enabled device comprises a sump pump, wherein the second network-enabled device comprises a dehumidifier, wherein the data trigger comprises an indication that the sump pump has activated, wherein the commands cause the dehumidifier to activate, and wherein the report comprises an alert indicating flooding or leaking in an area associated with the sump pump.

3. The method of claim 1 further comprising:
receiving, by the control system, water level data from a water level sensor;
determining, by the control system, that the water level data exceeds a predetermined threshold; and
sending, by the control system, a maintenance alert to the user device indicating that the first network-enabled device has malfunctioned.

4. The method of claim 3 further comprising:
determining, by the control system, that automatic maintenance requests are enabled; and
sending, by the control system, a request for maintenance to a service provider.

5. A system comprising:
a sump pump configured to pump water from an area around the sump pump to a drain;
a dehumidifier;
a water level sensor configured to generate water level data representing a water level in the area; and
a communications system comprising:
a gateway device coupled to and in electronic communication with the sump pump, the dehumidifier, and the water level sensor; and
a controller coupled to the gateway device, the controller including a processor and a memory device configured to store instructions which, when executed, cause the processor to:
receive data from the sump pump;
determine, based on the data, that the sump pump has activated; and
cause the dehumidifier to begin operation.

6. The system of claim 5, wherein the instructions, when executed, further cause the processor to:
send an alert to a user device associated with the system, the alert indicating that flooding has been detected in the area.

7. The system of claim 6, wherein the instructions, when executed, further cause the processor to:
receive the water level data from the water level sensor;
determine, based on the water level data, that the water level in the area exceeds a predetermined threshold; and
send a maintenance alert to the user device, indicating that the sump pump has malfunctioned.

8. The system of claim 7, wherein the instructions, when executed, further cause the processor to:
determine that automatic maintenance requests are enabled; and
upon determining that the water level in the area exceeds the predetermined threshold, send a request for maintenance of the sump pump to a service provider.

9. The system of claim 5 further comprising:
a humidity sensor configured to detect a humidity level of the area and generate corresponding humidity data; and
a moisture sensor configured to generate a moisture alert upon detecting moisture in the area.

10. The system of claim 9, wherein the instructions, when executed, further cause the processor to:
receive the humidity data from the humidity sensor;
determine, based on the humidity data, that the humidity level of the area exceeds a predetermined humidity threshold;
receive the moisture alert from the moisture sensor; and
upon receiving the moisture alert and determining that the humidity level exceeds the predetermined threshold, activate the sump pump.

* * * * *